United States Patent
Bartmann et al.

[11] Patent Number: 5,730,904
[45] Date of Patent: Mar. 24, 1998

[54] PARTIALLY FLUROINATED BENZENE DERIVATIVES, AND LIQUID-CRYSTALLINE MEDIUM

[75] Inventors: Ekkehard Bartmann, Erzhausen; Sabine Schoen, Darmstadt; Kazuaki Tarumi, Seeheim, all of Germany

[73] Assignee: Merck Patent Gesellschaft MIT Beschrankter Haftung, Darmstadt, Germany

[21] Appl. No.: 897,320

[22] Filed: Jul. 21, 1997

Related U.S. Application Data

[63] Continuation of Ser. No. 549,706, Nov. 15, 1995, abandoned.

Foreign Application Priority Data

May 19, 1993 [DE] Germany .................. 43 16 828.0

[51] Int. Cl.$^6$ .................. C09K 19/30; C09K 19/12
[52] U.S. Cl. .................. 252/299.63; 252/299.66; 570/144
[58] Field of Search .................. 252/299.66, 299.63; 570/144

[56] References Cited

U.S. PATENT DOCUMENTS 5,562,858  10/1996  Bartmann et al. .................. 252/299.66

FOREIGN PATENT DOCUMENTS 4408151   9/1995  Germany .
19528085  8/1996  Germany .

*Primary Examiner*—C. H. Kelly
*Attorney, Agent, or Firm*—Millen, White, Zelano & Branigan, P.C.

[57] ABSTRACT

Partially fluorinated benzene derivatives of the formula I

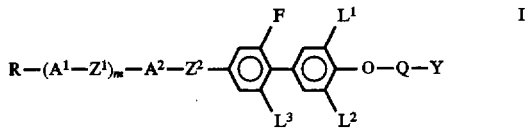

in which

R, $A^1$, $A^2$, Q, Y, $L^1$, $L^2$, $L^3$ and m are as defined in claim 1, are suitable as components of liquid-crystalline media.

16 Claims, No Drawings

PARTIALLY FLUROINATED BENZENE DERIVATIVES, AND LIQUID-CRYSTALLINE MEDIUM

This application is a continuation of application Ser. No. 08/549,706, filed Nov. 15, 1995 now abandoned.

The invention relates to partially fluorinated benzene derivatives of the formula I

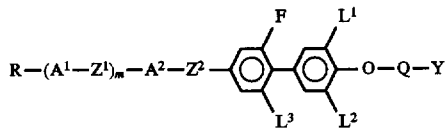

in which

R is H, an alkyl or alkenyl radical having 1 to 15 carbon atoms which is unsubstituted or monosubstituted by CN or $CF_3$ or at least monosubstituted by halogen, it also being possible for one or more $CH_2$ Groups in these radicals to be replaced, in each case independently of one another, by —O—, —S—,

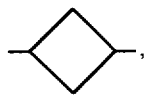

—CO—, —CO—O—, —O—CO— or —O—CO—O— in such a manner that O atoms are not linked directly to one another, $A^1$ and $A^2$ are each, independently of one another, (a) a trans-1,4-cyclohexylene radical in which, in addition, one or more nonadjacent $CH_2$ groups may be replaced by —O— and/or —S—, (b) a 1,4-phenylene radical in which, in addition, one or two CH groups may be replaced by N, (c) a radical from the group consisting of 1,4-cyclohexylene, 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, it being possible for the radicals (a) and (b) to be substituted by one or two fluorine atoms, $Z^1$ and $Z^2$ are each, independently of one another, —CO—O—, —O—CO—, —$CH_2$O—, —O$CH_2$—, —$CH_2CH_2$—, —CH=CH—, —C≡C—or a single bond, and one of the radicals $Z^1$ and $Z^2$ is alternatively —$(CH_2)_4$— or —CH=CH—$CH_2CH_2$—, and Q is —CHF— or —$CF_2$—, Y is an unsubstituted or halogen-substituted alkyl radical having 1–5 carbon atoms, $L^1$, $L^2$ and $L^3$ are each, independently of one another, H or F, and M is 0, 1 or 2.

The invention furthermore relates to the use of these compounds as components of liquid-crystalline media, and to liquid-crystal and electrooptical display elements which contain the liquid-crystalline media according to the invention.

The compounds of the formula I can be used as components of liquid-crystalline media, in particular for displays based on the principle of the twisted cell, the guest-host effect, the effect of deformation of aligned phases or the effect of dynamic scattering.

The invention had the object of finding novel, stable liquid-crystalline or mesogenic compounds which are suitable as components of liquid-crystalline media and in particular have at the same time comparatively low viscosity and relatively high dielectric anisotropy.

It has now been found that compounds of the formula I are eminently suitable as components of liquid-crystalline media. In particular, they have comparatively low viscosities. They can be used to obtain stable liquid-crystalline media which have a broad mesophase range and advantageous values for the optical and dielectric anisotropy. These media furthermore have very good low-temperature behavior and extraordinarily low threshold voltages.

WO 91-00102 and DE-A 40 02 374 describe similar partially fluorinated benzene derivatives.

In view of the extremely wide variety of areas of application of such compounds of high Δε, however, it was desirable to have further compounds of high nematogeneity available which have properties precisely tailored to the particular application.

In addition, the provision of the compounds of the formula I very generally considerably broadens the range of liquid-crystalline substances which are suitable, from various applicational points of view, for the preparation of liquid-crystalline mixtures.

The compounds of the formula I have a broad field of applications. Depending on the choice of substituents, these compounds can be used as base materials from which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or to optimize its threshold voltage and/or viscosity.

In the pure state, the compounds of the formula I are colorless and form liquid-crystalline mesophases in a temperature range which is favorably located for electrooptical use. They are stable chemically, thermally and to light.

The invention thus relates to the compounds of the formula I and to the use of these compounds as components of liquid-crystalline media. The invention furthermore relates to liquid-crystalline media containing at least one compound of the formula I, and to liquid-crystal display elements, in particular electro-optical display elements, which contain media of this type.

In the compounds of the formulae above and below, m is preferably 0. Y is preferably an unsubstituted or halogen-substituted methyl, ethyl, or propyl radical. Halogen is preferably fluorine.

Y is preferably $CH_3$, $CH_2CH_3$, $CHF_2$, $CH_2CHF_2$, $CH_2CF_3$, $CF_2$—$CHF_2$ or $CF_3$.

Q—Y is preferably CHF—$CHF_2$, $CF_2$—$CH_2$—$CF_3$ or $CF_2$—$CH_3$, furthermore $CF_2$—$CH_2$—$CHF_2$, $CHF$—$CF_2$—$CHF_2$ or $CF_2$—$CH_2$—$CHF_2$.

$L^3$ is preferably F and $L^1$ and $L^2$ are H or F. Particular preference is given to compounds in which $L^{1-3}$ are fluorine.

R is preferably alkyl, furthermore alkoxy. $A^1$ and/or $A^2$ are preferably Phe, Cyc, Che, Pyr or Dio. The compounds of the formula I preferably contain not more than one of the radicals Bi, Pyd, Pyr, Dio or Dit.

Preference is also given to compounds of the formula I and all subformulae in which $A^1$ and $A^2$ are 1,4-phenylene which is monosubstituted or disubstituted by F or monosubstituted by CN. These are, in particular, 2-fluoro-1,4-phenylene, 3-fluoro-1,4-phenylene and 3,5-difluoro-1,4phenylene, and 2cyano-1,4-phenylene and 3-cyano-1,4-phenylene.

$Z^1$ and $Z^2$ are preferably a single bond, —CO—O—, —O—CO— and —$CH_2CH_2$—, and secondarily preferably —$CH_2$O— and —O$CH_2$—.

If one of the radicals $Z^1$ and $Z^2$ is —(CH$_2$)$_4$— or —CH=CH—CH$_2$CH$_2$—, the other radical $Z^1$ or $Z^2$ (if present) is preferably a single bond.

If R is an alkyl radical and/or an alkoxy radical, this may be straight-chain or branched. It is preferably straight-chain, has 2, 3, 4, 5, 6 or 7 carbon atoms and is accordingly preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

If R is an alkyl radical in which one CH$_2$ group has been replaced by —CH=CH—, this may be straight-chain or branched. It is preferably straight-chain and has 2 to 10 carbon atoms. Accordingly, it is in particular vinyl, prop-1- or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, or dec-1-, 2-, 3-, 4-, 5-, 6-, 7-, 8- or dec -9-enyl.

If R is an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

Accordingly, they are in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl 2-(propoxycarbonyl)ethyl, 3-(methoxycarbonyl)propyl, 3-(ethoxycarbonyl)propyl or 4-(methoxycarbonyl)butyl.

If R is an alkyl radical in which one CH$_2$ group has been replaced by unsubstituted or substituted —CH=CH— and an adjacent CH$_2$ group has been replaced by CO or CO—O or O—CO—, this may be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxbutyl, 5-methacryloyloxypentyl, 6-methacryloyloxyhexyl, 7-methacryloyloxyheptyl, 8-methacryloyloxyoctyl or 9-methacryloyloxynonyl.

If R is an alkyl or alkenyl radical which is monosubstituted by CN or CF$_3$, this radical is preferably straight-chain and the substitution is by CN or CF$_3$ in the ω-position.

If R is an alkyl or alkenyl radical which is at least monosubstituted by halogen, this radical is preferably straight-chain and halogen is preferably F or Cl. In the case of multiple substitution, halogen is preferably F. The resulting radicals also include perfluorinated radicals. In the case of monosubstitution, the fluorine or chlorine substituent can be in any desired position, but is preferably in the ω-position.

Compounds of the formula I which contain wing groups R which are suitable for poly addition reactions are suitable for the preparation of liquid-crystalline polymers.

Compounds of the formula I containing branched wing groups R may occasionally be of importance due to better solubility in customary liquid-crystalline base materials, but in particular as chiral dopes if they are optically active. Smectic compounds of this type are suitable as components for ferroelectric materials.

Compounds of the formula I having S$_A$ phases are suitable, for example, for thermally addressed displays.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy and 1-methylheptoxy.

If R is an alkyl radical in which two or more CH$_2$ groups have been replaced by —O— and/or —CO—O—, this may be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis (methoxycarbonyl)methyl, 2,2-bis(methoxycarbonyl) ethyl, 3,3-his (methoxycarbonyl)propyl, 4,4-bis (methoxycarbonyl) butyl, 5,5-bis (methoxycarbonyl)pentyl, 6,6bis (methoxycarbonyl) hexyl, 7,7his (methoxycarbonyl) heptyl, 8,8bis (methoxycarbonyl) octyl, bis(ethoxycarbonyl) methyl, 2,2-bis(ethoxycarbonyl)ethyl, 3,3-bis (ethoxycarbonyl)propyl, 4,4-bis(ethoxycarbonyl)butyl or 5,5-bis(ethoxycarbonyl)hexyl.

Compounds of the formula I which contain wing groups R which are suitable for polycondensations are suitable for the preparation of liquid-crystalline polycondensates.

Formula I covers the racemates of these compounds and the optical antipodes, and mixtures thereof.

Of these compounds of the formula I and the subformulae, preference is given to those in which at least one of the radicals present therein has one of the preferred meanings indicated.

In the compounds of the formula I, preferred stereoisomers are those in which the rings Cyc and piperidine are trans-1,4-disubstituted. Those of the abovementioned formulae which contain one or more groups Pyd, Pyr and/or Dio in each case cover the two 2,5-positional isomers.

Preferred smaller groups of compounds are those of the subformulae I1 to I15:

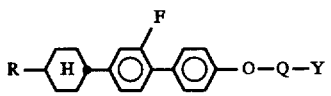

I1

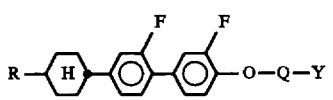

I2

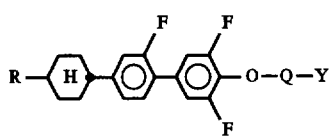 13

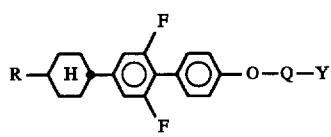 14

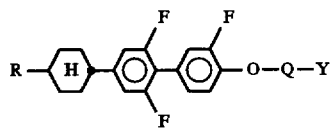 15

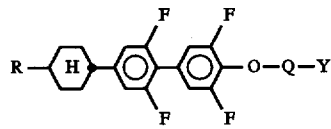 16

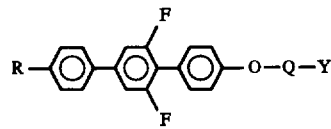 17

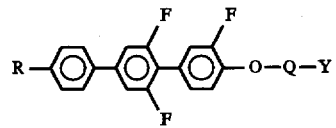 18

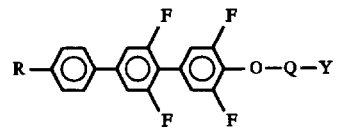 19

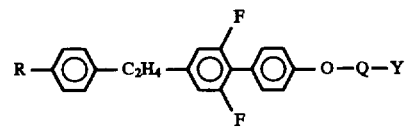 110

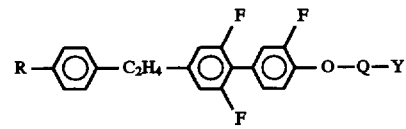 111

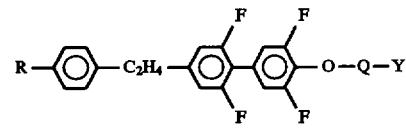 112

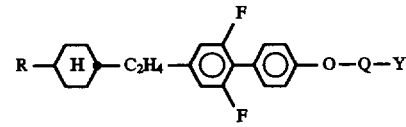 113

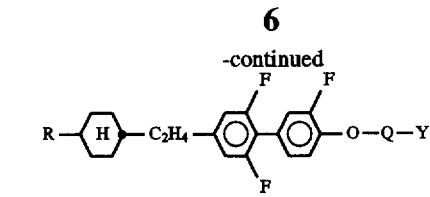 114

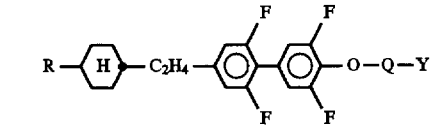 115

Particular preference is given to compounds of the formulae I1, I2, I3, I5, I6 and I9.

The invention likewise relates to compounds of the formula

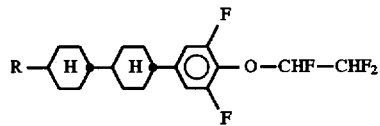 16

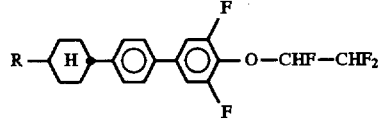 17

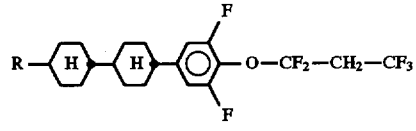 18

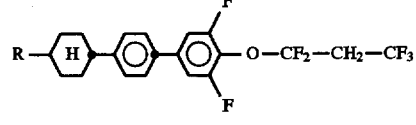 19

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart, Vol. IX, pp. 867 ff.), to be precise under reaction conditions which are known and suitable for said reactions. Use may also be made here of variants which are known per se, but are not described here in greater detail.

The compounds according to the invention can be prepared, for example, by metalating a compound of the formula II,

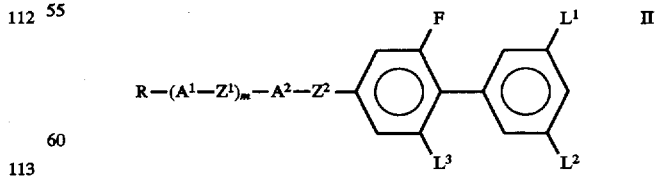 II in which R, $A^1$, $A^2$, $Z^1$, $Z^2$, $L^1$, $L^2$, $L^3$ and m are as defined above, in accordance with the reaction scheme below, and subsequently reacting the product with a suitable electrophile:

Scheme 1
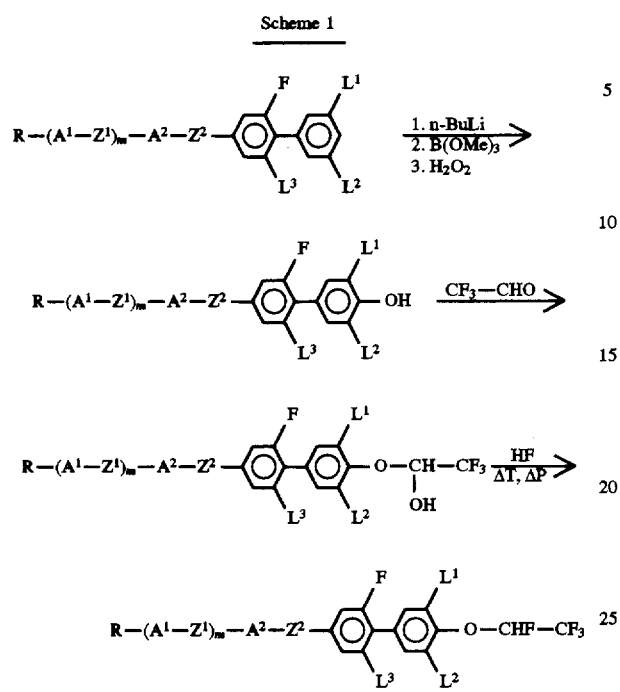
The compounds of the formula I in which Q—Y is CHF—CF$_3$ are obtainable from the resultant phenol by known methods, for example by reacting the phenol with CF$_3$—CHO and HF.
Scheme 2
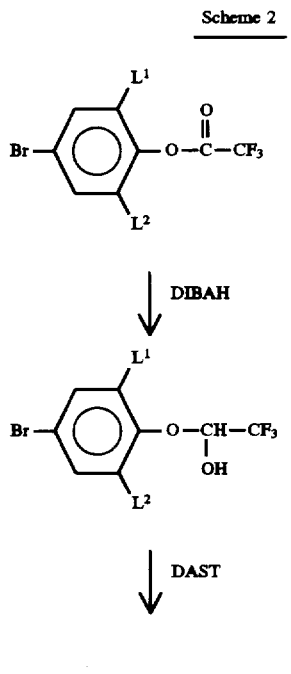
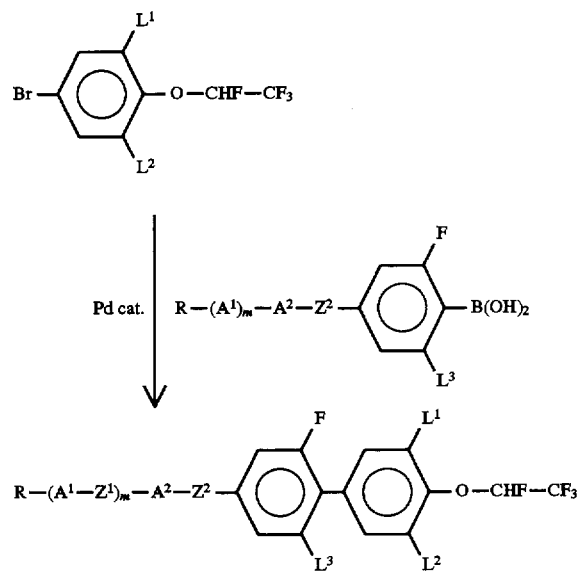
Scheme 3
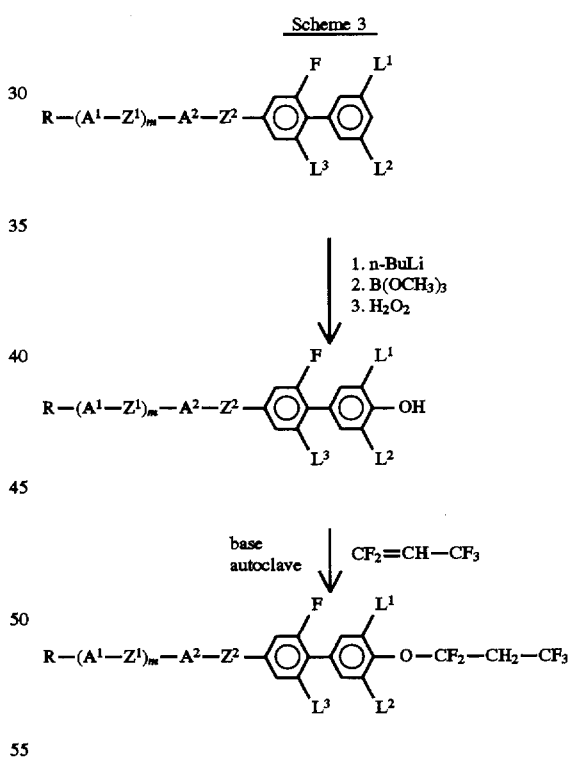
Scheme 4
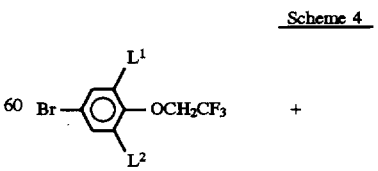

Scheme 4
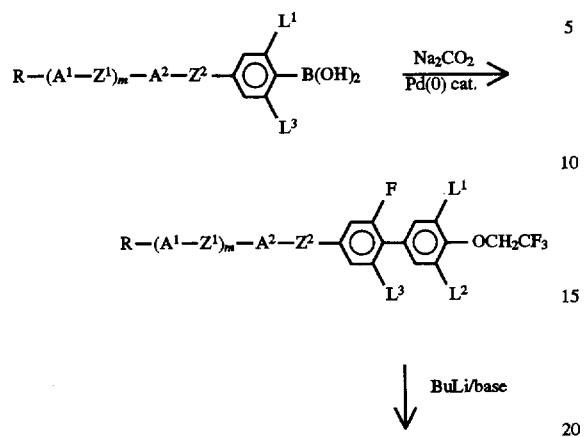
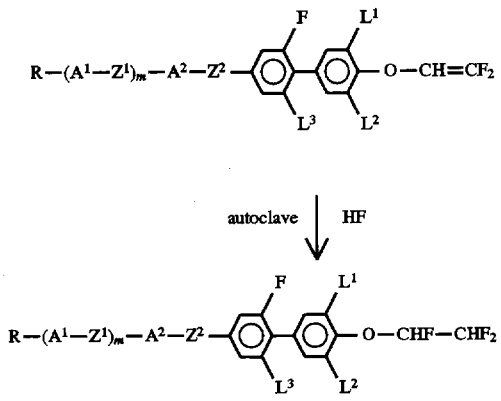
Compounds of the formula I in which Q—Y CF$_2$-alkyl can be prepared, for example, as follows.
Scheme 5
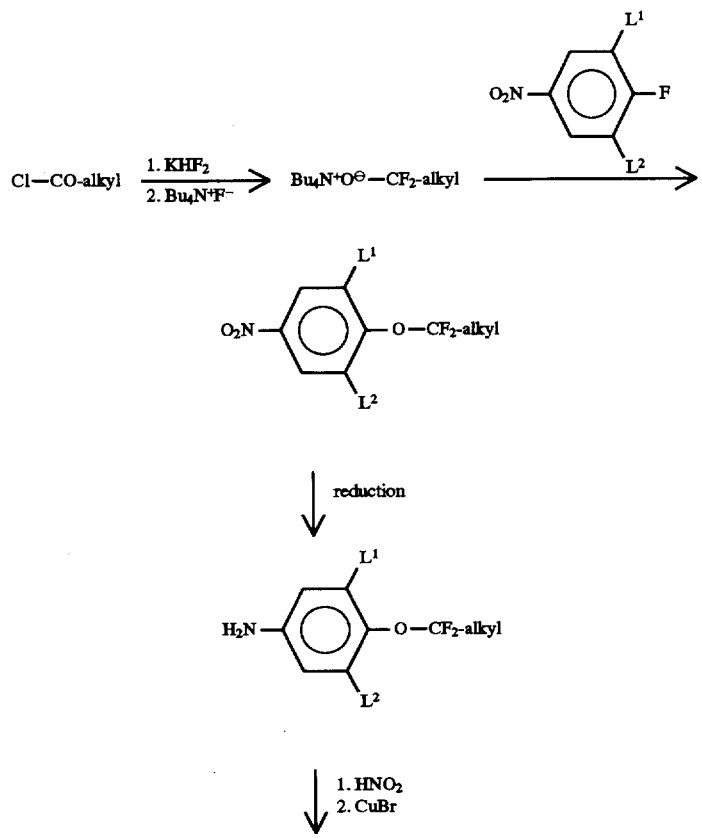

-continued
Scheme 5

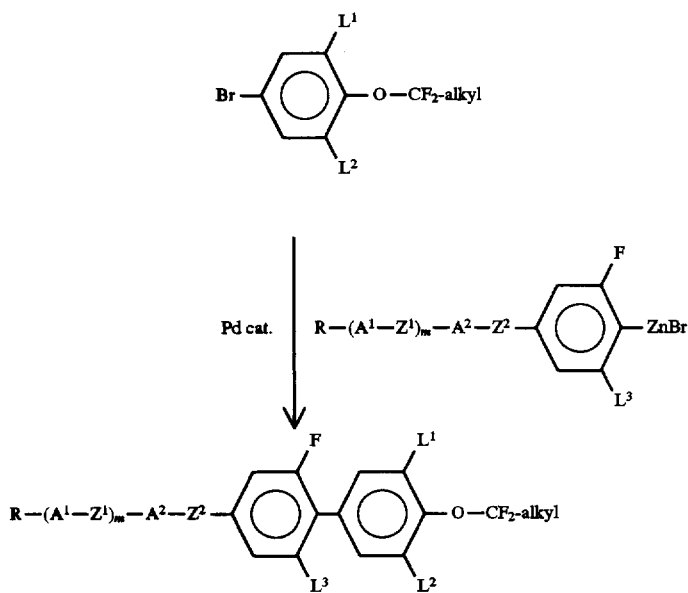

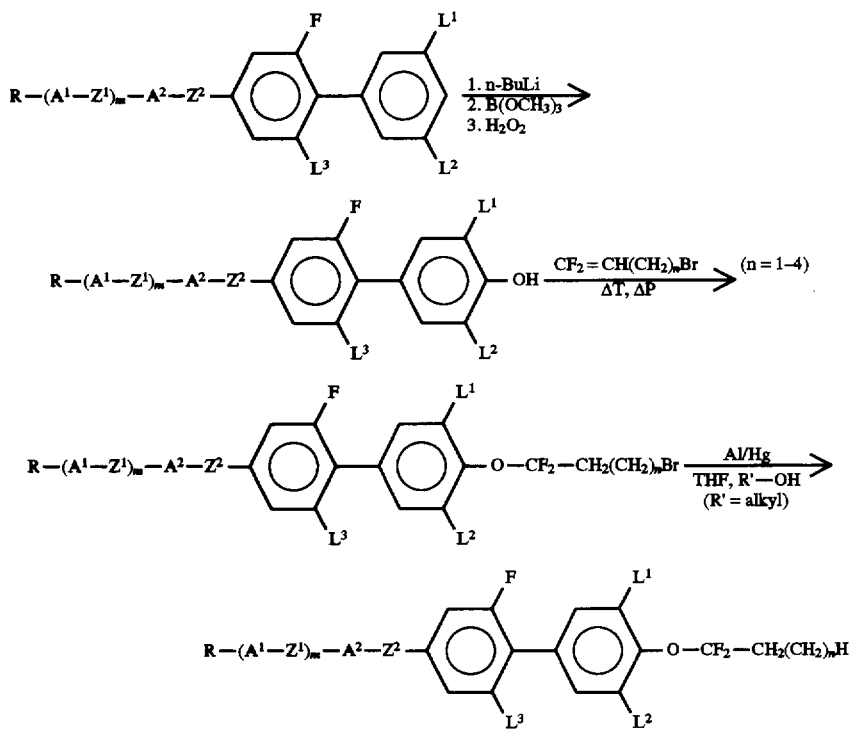

Further synthetic methods are apparent to the person skilled in the art. For example, appropriately 5-substituted 1,3-difluorobenzene compounds or monofluorinated analogues ($L^2$=H) can be converted, in accordance with the above scheme, into the 1,3-difluoro compounds or monofluorinated analogues ($L^2$=H), and the radical R—($A^1$—$Z^1$)$_m$—$A^2$—$Z^2$— subsequently introduced by reactions customary in liquid-crystal chemistry (for example esterification, etherification or coupling, for example as described in the article by E. Poetsch, Kontakte (Darmstadt) 1988 (2), p. 15).

Compounds of the formula II can be prepared, for example, by the following synthetic schemes:

Scheme 7
$(A = -(-A^1-Z^1)_m-A^2-/Z^2 = -CH_2CH_2-)$
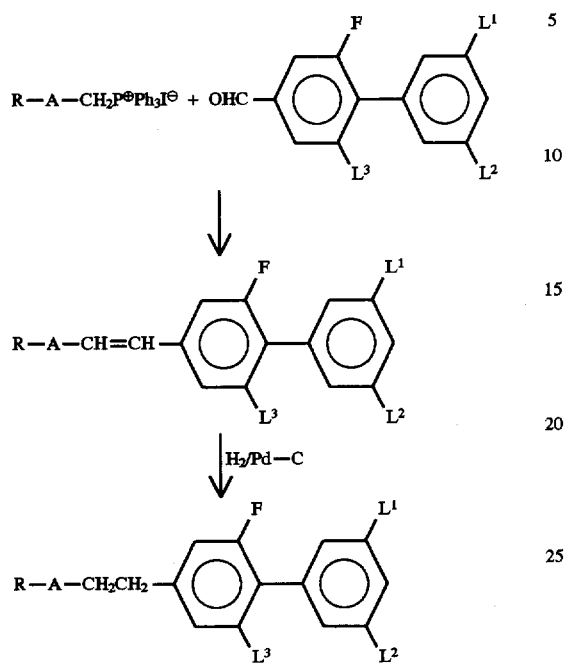
Scheme 8
$(A = -(-A^1-Z^1)_m-A^2-/Z^2 = \text{single bond})$
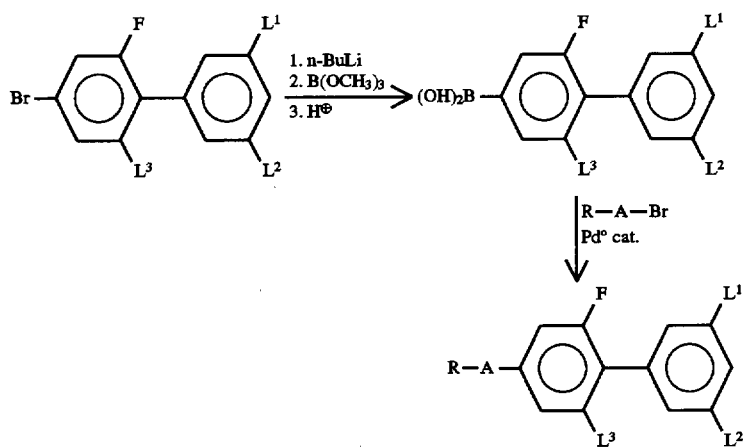

Scheme 9

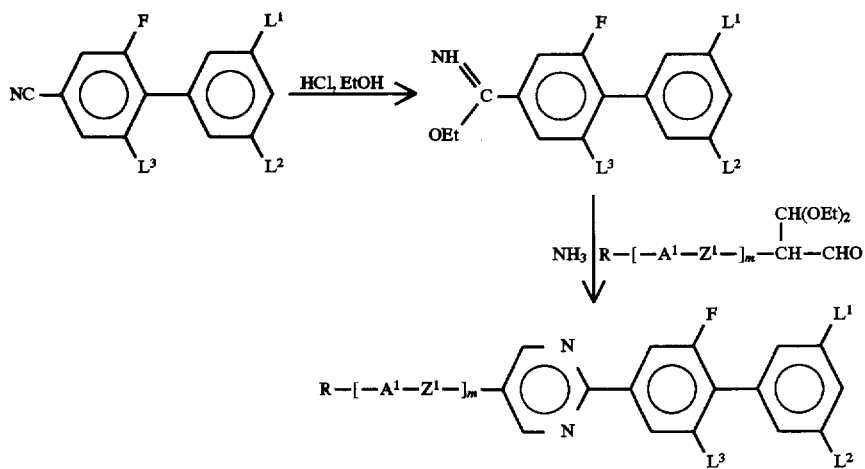

Scheme 10

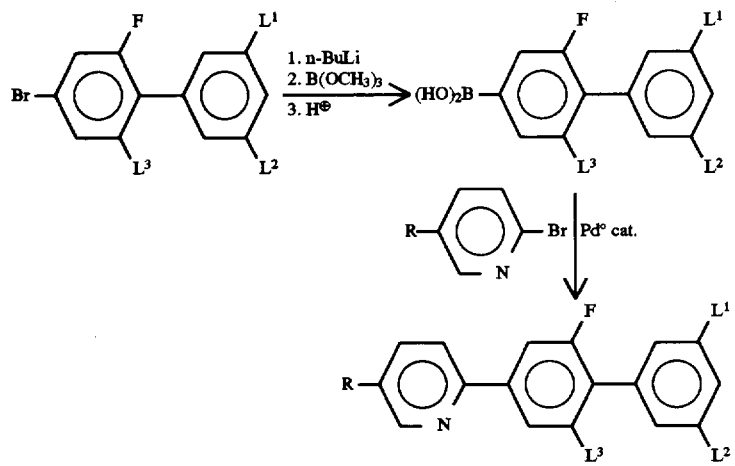

Scheme 11

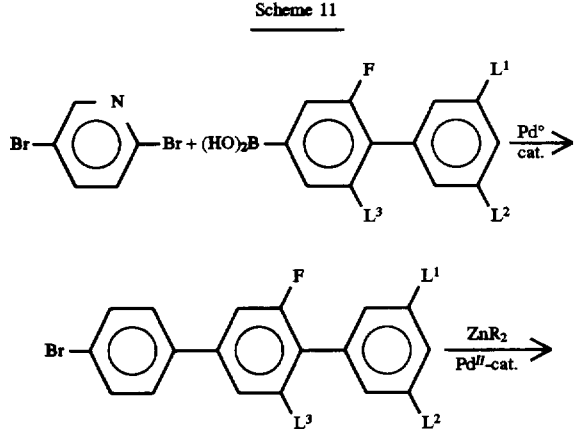

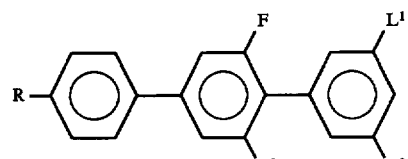

-continued
Scheme 11

The starting materials are either known or can be prepared analogously to known compounds.

Esters of the formula I can also be obtained by esterification of corresponding carboxylic acids (or reactive derivatives thereof) using alcohols or phenols (or reactive derivatives thereof) or by the DCC method (DCC= dicyclohexylcarbodiimide).

The corresponding carboxylic acids and alcohols or phenols are known or can be prepared analogously to known methods.

In a further process for the preparation of the compounds of the formula I, an aryl halide is reacted with an olefin in the presence of a tertiary amine and in the presence of a palladium catalyst (cf. R. F. Heck, Acc. Chem. Res. 12 (1979) 146). Examples of suitable aryl halides are chlorides, bromides and iodides, in particular bromides and iodides. The tertiary amines necessary for the success of the coupling reaction, such as, for example, triethylamine, are also suitable as solvent. Examples of suitable palladium catalysts are palladium salts, in particular Pd(II) acetate, with organic phosphorus (III) compounds, such as, for example, triarylphosphines. This reaction can be carried out in the presence or absence of an inert solvent at temperatures between about 0° and 150°, preferably between 20° and 100°; examples of suitable solvents are nitriles, such as acetonitrile, or hydrocarbons, such as benzene or toluene. The aryl halides and olefins employed as starting materials are frequently commercially available or can be prepared by processes known from the literature, for example by halogenation of corresponding parent compounds or by elimination reactions on corresponding alcohols or halides.

In this way, it is possible to prepare, for example, stilbene derivatives. The stilbenes can furthermore be prepared by reacting a 4-substituted benzaldehyde with a corresponding phosphorus ylide by the Wittig method. However, it is also possible to prepare tolans of the formula I by employing monosubstituted acetylene in place of the olefin (Synthesis 627 (1980) or Tetrahedron Lett. 27, 1171 (1986)).

A further way of coupling aromatic compounds is to react aryl halides with aryltin compounds. These reactions are preferably carried out with addition of a catalyst, such as, for example, a palladium(0) complex, in inert solvents, such as hydrocarbons, at high temperatures, for example in boiling xylene, under a protective gas.

Coupling reactions of alkynyl compounds with aryl halides can be carried out analogously to the process described by A. O. King, E. Negishi, F. J. Villani and A. Silveira in J. Org. Chem. 43, 358 (1978).

Tolans of the formula I can also be prepared via the Fritsch-Buttenberg-Wiecheil rearrangement (Ann. 279, 319, 1984), in which 1,1-diaryl-2-haloethylenes are rearranged in the presence of strong bases to give diarylacetylenes.

Tolans of the formula I can also be prepared by brominating the corresponding stilbenes followed by dehydrohalogenation. Use can also be made here of variants of these reactions which are known per se, are not described here in greater detail.

Ethers of the formula I can be obtained by etherification of corresponding hydroxyl compounds, preferably corresponding phenols, the hydroxyl compound expediently first being converted into a corresponding metal derivative, for example into the corresponding alkali metal alkoxide or alkali metal phenoxide by treatment with NaH, NaNH$_2$, NaOH, KOH, Na$_2$CO$_3$ or K$_2$CO$_3$. This metal derivative can then be reacted with the appropriate alkyl halide, sulfonate or dialkyl sulfate, expediently in an inert solvent, such as, for example, acetone, 1,2-dimethoxyethane, DMF or dimethyl sulfoxide, or alternatively with an excess of aqueous or aqueous-alcoholic NaOH or KOH at temperatures between about 20° and 100° C.

The starting materials are either known or can be prepared analogously to known compounds.

The preferred trans-isomers can be prepared by isomerization methods known from the literature. The precursors where R°=H which may be obtained are converted into the compounds of the formula I' entirely analogously to the precursors of the compounds of the formula I by introduction of the radical —Y—.

The aldehydes can be obtained by Heck reaction of appropriately substituted 1-bromo-3-fluorobenzene derivatives with allyl alcohol.

The synthesis of some particularly preferred compounds is shown below in greater detail:

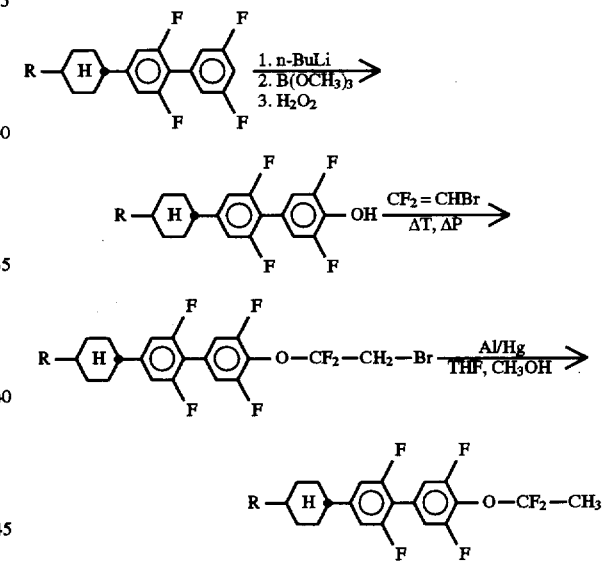

Scheme 12

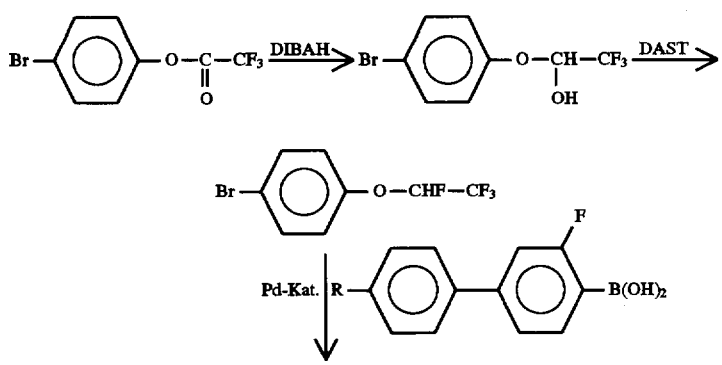

Scheme 13

-continued
Scheme 13

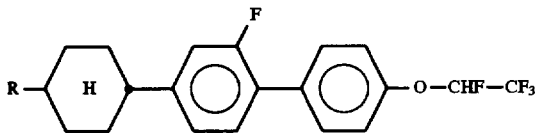

Scheme 14

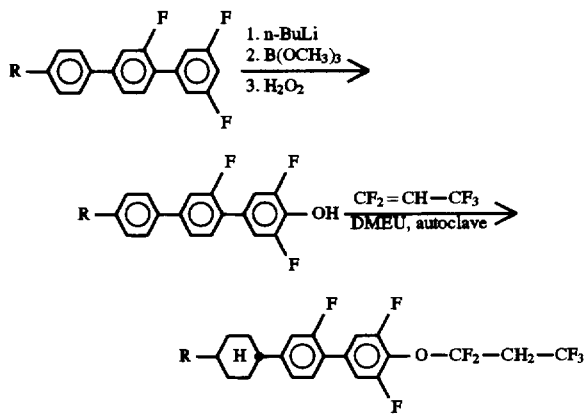

Scheme 15

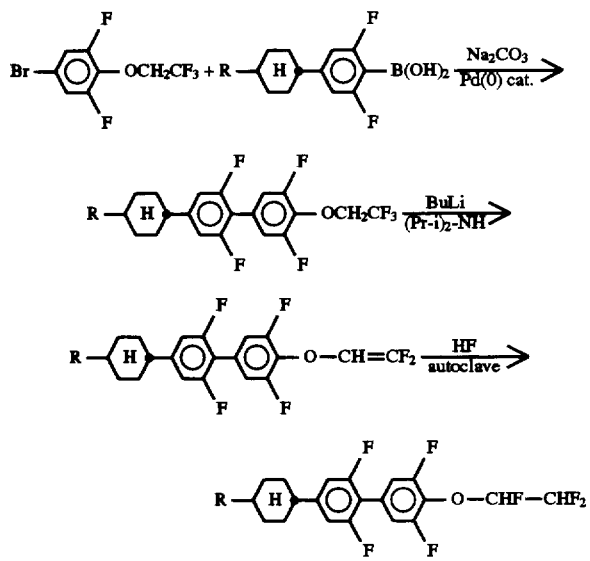

The liquid-crystalline media according to the invention preferably contain 2 to 40, in particular 4 to 30, components as further constituents besides one or more compounds according to the invention. These media very particularly preferably contain 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterized by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl,-Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably contain one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller subgroup of compounds of formulae 1, 2, 3, 4 and 5, R' and R" are each, independently of one another, alkyl, alkenyl, alkoxy, alkoxyalkyl, alkenyloxy or alkanoyloxy having up to 8 carbon atoms. This smaller subgroup is referred to as group A below, and the compounds are labeled with the subformulae 1a, 2a, 3a, 4a and 5a. In most of these compounds, R' and R" are different from one another, one of these radicals usually being alkyl, alkenyl, alkoxy or alkoxyalkyl.

In another smaller subgroup of the compounds of the formulae 1, 2, 3, 4 and 5, known as group B, R" is —F, —Cl, —NCS or —(O)$_i$CH$_{3-(k+1)}$F$_k$Cl$_1$, where i is 0 or 1 and k+1 is 1, 2 or 3; the compounds in which R" has this meaning are labeled with the subformulae 1b, 2b, 3b, 4b and 5b. Particular preference is given to the compounds of the subformulae 1b, 2b, 3b, 4b and 5b in which R" is —F, —Cl, —NCS, —CF$_3$, —OCHF$_2$ or —OCF$_3$.

In the compounds of the subformulae 1b, 2b, 3b, 4b and 5b, R' is as defined for the compounds of the subformulae 1a–5a and is preferably alkyl, alkenyl, alkoxy or alkoxyalkyl.

In a further smaller subgroup of the compounds of the formulae 1, 2, 3, 4 and 5, R" is —CN; this subgroup is known as group C below, and the compounds of this subgroup are accordingly described by subformulae 1c, 2c, 3c, 4c and 5c. In the compounds of the subformulae 1c, 2c, 3c, 4c and 5c, R' is as defined for the compounds of the subformulae 1a–5a and is preferably alkyl, alkoxy or alkenyl.

In addition to the preferred compounds of groups A, B and C, other compounds of the formulae 1, 2, 3, 4 and 5 with other variants of the proposed substituents are also common. All these substances can be obtained by methods known from the literature or analogously thereto.

The media according to the invention preferably contain one or more compounds selected from group A and/or group B and/or group C in addition to compounds of the formula I according to the invention. The proportions by weight of the compounds from these groups in the media according to the invention are preferably Group A: from 0 to 90%, preferably from 20 to 90%, in particular from 30 to 90%
Group B: from 0 to 80%, preferably from 10 to 80%, in particular from 10 to 65%
Group C: from 0 to 80%, preferably from 5 to 80%, in particular from 5 to 50% the sum of the proportions by weight of the compounds from groups A and/or B and/or C present in the respective media according to the invention preferably being from 5 to 90% and in particular from 10 to 90%.

The media according to the invention preferably contain 1 to 40%, in particular preferably 5 to 30%, of compounds according to the invention. Further preferred media are those which contain more than 40%, in particular 45 to 90%, of compounds according to the invention. The media preferably contain three, four or five compounds according to the invention.

The media according to the invention are prepared in a manner which is customary per se. In general, the components are dissolved in one another, expediently at elevated temperature. By means of suitable additives, the liquid-crystalline phases can be modified in accordance with the invention in such a manner that they can be used in all types of liquid-crystal display elements which have been disclosed hitherto. Additives of this type are known to those skilled in the art and are described in detail in the literature (H. Kelker/R. Hatz, Handbook of Liquid Crystals, Verlag Chemie, Weinheim, 1980). For example, pleochroic dyes can be added for the production of colored guest-host systems, or substances can be added to modify the dielectric anisotropy, the viscosity and/or the orientation of the nematic phases.

In the present application and in the examples below, the structures of the liquid-crystal compounds are indicated by means of acronyms, the transformation into chemical formulae being carried out in accordance with Tables A and B below. All radicals $C_nH_{2n+1}$ and $C_mH_{2m+1}$ are straight-chain alkyl radicals having n or m carbon atoms respectively. The coding in Table B is self-evident. In Table A, only the acronym for the parent structure is shown. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |

TABLE A

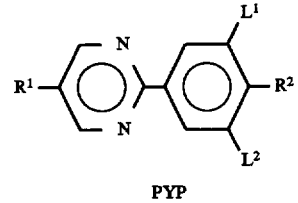

PYP

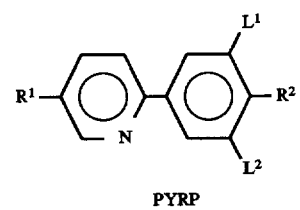

PYRP

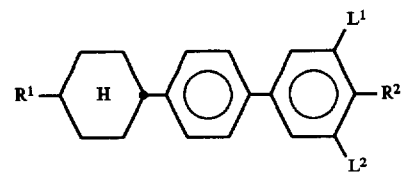

BCH

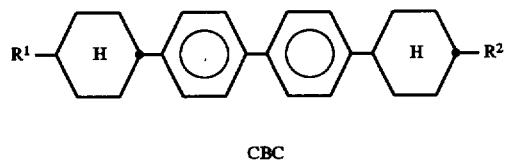

CBC

TABLE A-continued
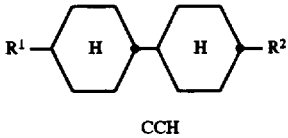
CCH
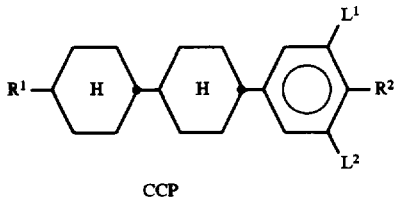
CCP
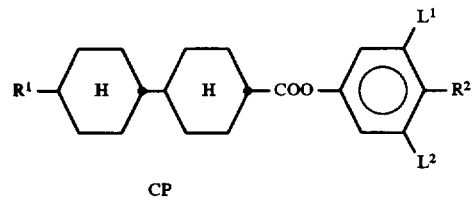
CP
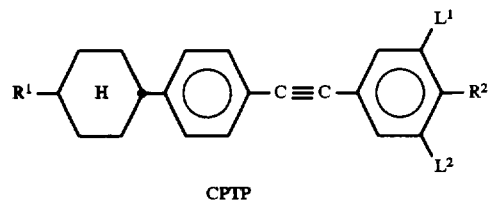
CPTP
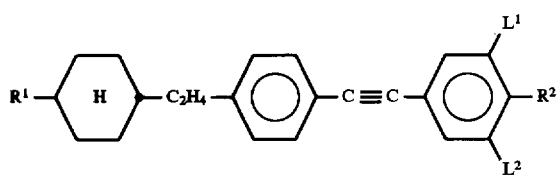
CEPTP
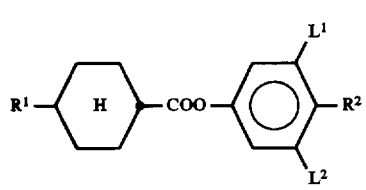
D
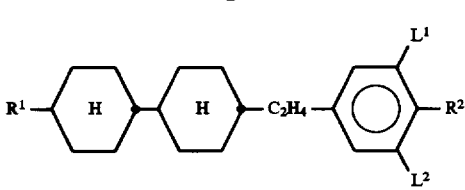
ECCP
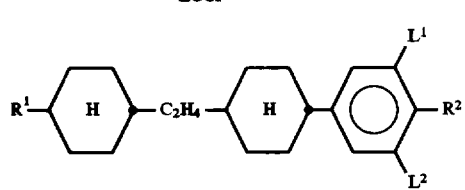
CECP
TABLE A-continued
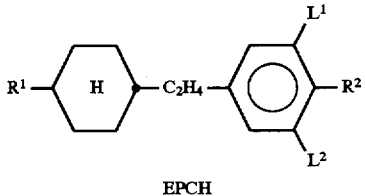
EPCH
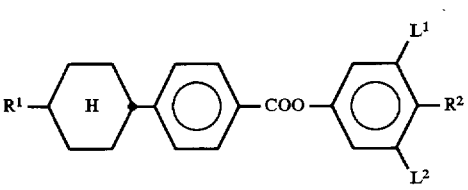
HP
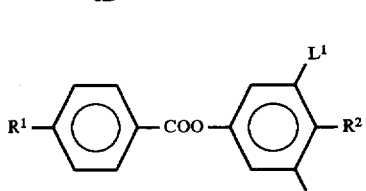
ME
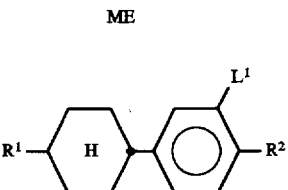
PCH
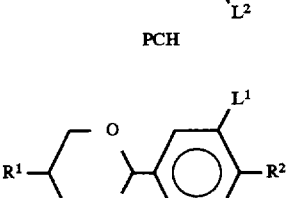
PDX
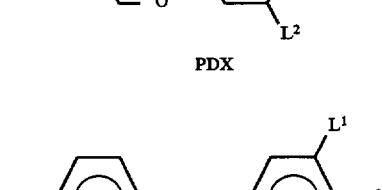
PTP
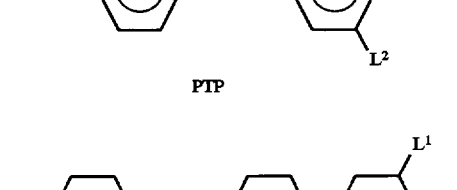
BECH TABLE A-continued

EBCH

CPC

CCEB

CCB

CCB-n.FX

B

B-n.FX

TABLE B

T15

TABLE B-continued

K3n

M3n

BCH-n.FX

Inm

C-nm

C15

CB15

CBC-nmF

CCPC-nm

CH-nm

HH-nm

OS-nm

ECBC-nm

T-nFN

TABLE B-continued

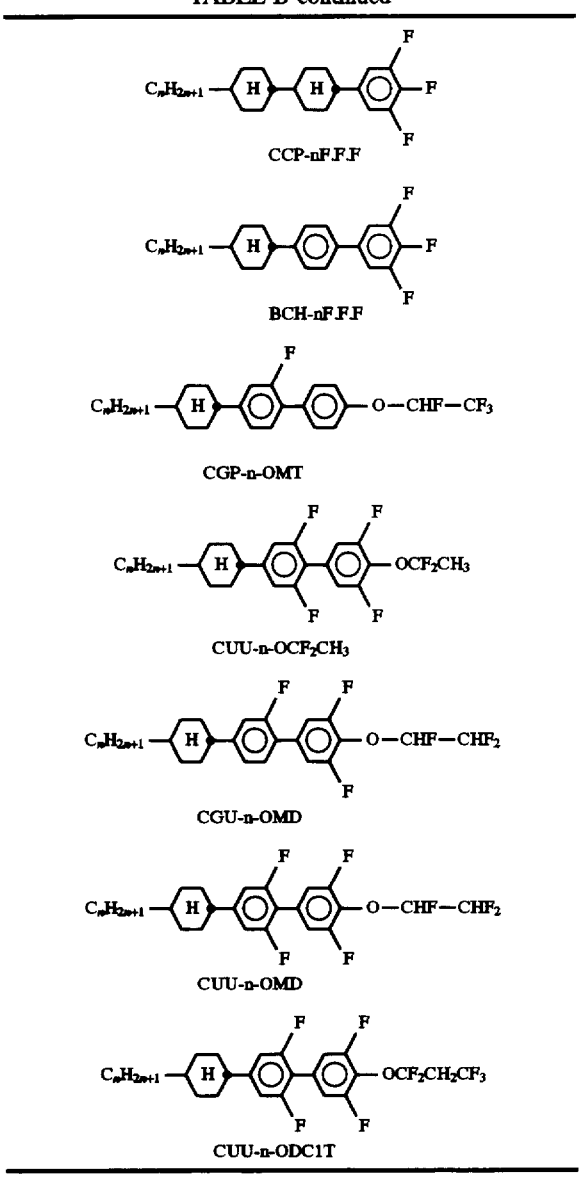

The examples below are intended to illustrate the invention without representing a limitation. Above and below, percentages are by weight. All temperatures are given in degrees celcius. m.p. denotes melting point, c.p.=clearing point. Furthermore, C=crystalline state, N=nematic phase, S=smectic phase, I=isotropic phase. The numbers between these symbols indicate the transition temperatures. An denotes optical anisotropy (589 nm, 20° C.) and the viscosity (mm²/sec) was determined at 20° C.

"Conventional work-up" means that water is added if desired, the mixture is extracted with dichloromethane, diethyl ether or toluene, the organic phase is separated off, dried and evaporated, and the product is purified by distillation under reduced pressure or crystallization and/or chromatography. The following abbreviations are used:

DAST Diethylaminosulfur trifluoride
DMEU 1,3-Dimethyl-2-imidazoladinone
POT Potassium tert-butoxide
THF Tetrahydrofuran
pTSOH p-Toluenesulfonic acid

EXAMPLE 1

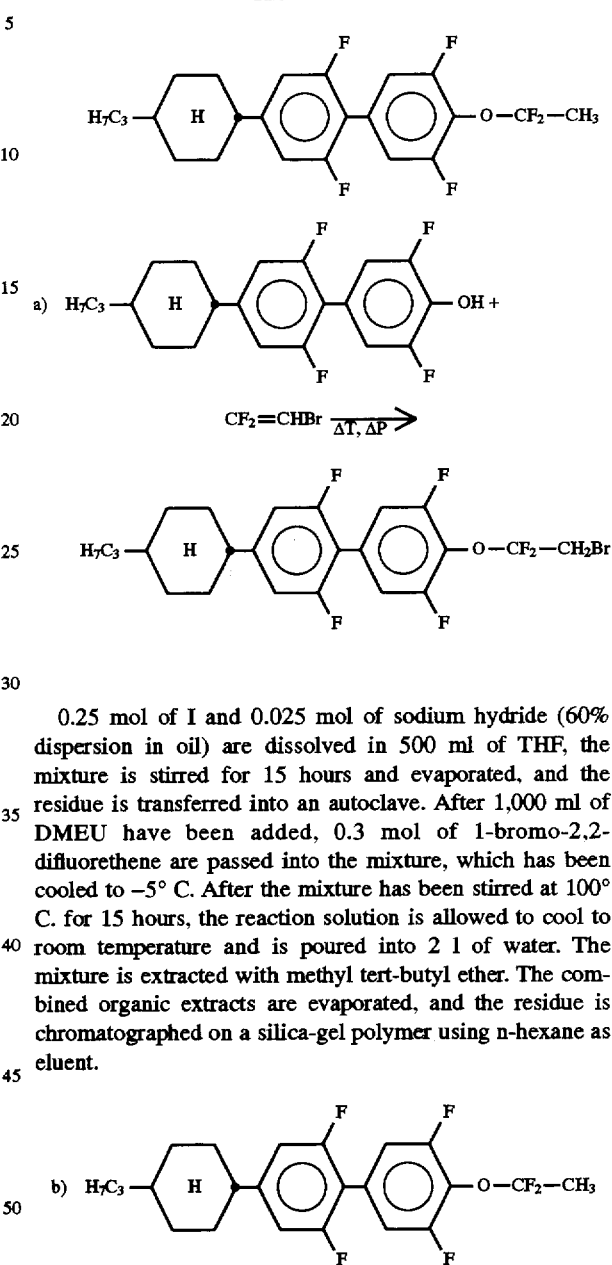

0.25 mol of I and 0.025 mol of sodium hydride (60% dispersion in oil) are dissolved in 500 ml of THF, the mixture is stirred for 15 hours and evaporated, and the residue is transferred into an autoclave. After 1,000 ml of DMEU have been added, 0.3 mol of 1-bromo-2,2-difluorethene are passed into the mixture, which has been cooled to −5° C. After the mixture has been stirred at 100° C. for 15 hours, the reaction solution is allowed to cool to room temperature and is poured into 2 l of water. The mixture is extracted with methyl tert-butyl ether. The combined organic extracts are evaporated, and the residue is chromatographed on a silica-gel polymer using n-hexane as eluent.

0.5 mol of aluminum shot and 0.05 mol of HgCl₂ and the intermediate obtained from Example 1a) are introduced at 0° C. into a mixture of 250 ml of THF and 250 ml of methanol. The mixture is stirred at 0° C. for 24 hours and at room temperature for a further 24 hours. The mixture is subsequently filtered, and 200 ml if petroleum ether and 1 l of water are added to the filtrate. The organic phase is separated off, washed a number of times with 5N hydrochloric acid and evaporated. The residue is chromatographed on a silica-gel polymer using n-hexane. The eluate is evaporated in a rotary evaporator, and the residue is recrystallized from ethanol.

The following compounds of formula

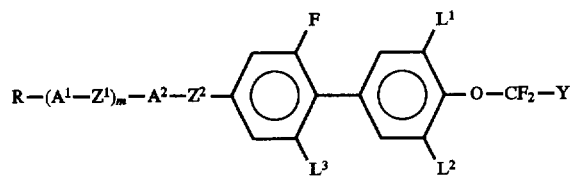

are prepared analogously:

| R | $-(A^1-Z^1)_m-A^2-Z^2-$ | $L^1$ | $L^2$ | $L^3$ | Y |
|---|---|---|---|---|---|
| $C_2H_5$ | cyclohexyl | F | F | F | $CH_3$ |
| $C_2H_5$ | cyclohexyl | F | F | H | $CH_3$ |
| $C_2H_5$ | cyclohexyl | F | H | F | $CH_3$ |
| $C_2H_5$ | cyclohexyl | F | H | H | $CH_3$ |
| $C_2H_5$ | cyclohexyl | H | H | F | $CH_3$ |
| $C_2H_5$ | cyclohexyl | H | H | H | $CH_3$ |
| $n-C_3H_7$ | cyclohexyl | F | F | H | $CH_3$ |
| $n-C_3H_7$ | cyclohexyl | F | H | F | $CH_3$ |
| $n-C_3H_7$ | cyclohexyl | H | H | F | $CH_3$ |
| $n-C_3H_7$ | cyclohexyl | F | H | H | $CH_3$ |
| $n-C_3H_7$ | cyclohexyl | H | H | H | $CH_3$ |
| $n-C_5H_{11}$ | cyclohexyl | F | F | F | $CH_3$ |
| $n-C_5H_{11}$ | cyclohexyl | F | F | H | $CH_3$ |
| $n-C_5H_{11}$ | cyclohexyl | F | H | F | $CH_3$ |
| $n-C_5H_{11}$ | cyclohexyl | F | H | H | $CH_3$ |
| $n-C_5H_{11}$ | cyclohexyl | H | H | F | $CH_3$ |
| $n-C_5H_{11}$ | cyclohexyl | H | H | H | $CH_3$ |
| $n-C_6H_{13}$ | cyclohexyl | F | F | F | $CH_3$ |
| $n-C_6H_{13}$ | cyclohexyl | F | F | H | $CH_3$ |
| $n-C_6H_{13}$ | cyclohexyl | F | H | F | $CH_3$ |
| $n-C_6H_{13}$ | cyclohexyl | F | H | H | $CH_3$ |
| $n-C_6H_{13}$ | cyclohexyl | H | H | F | $CH_3$ |
| $n-C_6H_{13}$ | cyclohexyl | H | H | H | $CH_3$ |
| $C_2H_5$ | cyclohexyl | F | F | F | $CH_2CH_3$ |
| $C_2H_5$ | cyclohexyl | F | F | H | $CH_2CH_3$ |
| $C_2H_5$ | cyclohexyl | F | H | F | $CH_2CH_3$ |
| $C_2H_5$ | cyclohexyl | F | H | H | $CH_2CH_3$ |

-continued

| R | $-(A^1-Z^1)_m-A^2-Z^2-$ | $L^1$ | $L^2$ | $L^3$ | Y |
|---|---|---|---|---|---|
| $C_2H_5$ |  | H | H | F | $CH_2CH_3$ |
| $C_2H_5$ |  | H | H | H | $CH_2CH_3$ |
| $n-C_3H_7$ |  | F | F | H | $CH_2CH_3$ |
| $n-C_3H_7$ | 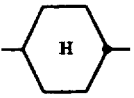 | F | H | F | $CH_2CH_3$ |
| $n-C_3H_7$ |  | H | H | F | $CH_2CH_3$ |
| $n-C_3H_7$ |  | F | H | H | $CH_2CH_3$ |
| $n-C_3H_7$ |  | H | H | H | $CH_2CH_3$ |
| $n-C_5H_{11}$ |  | F | F | F | $CH_2CH_3$ |
| $n-C_5H_{11}$ |  | F | F | H | $CH_2CH_3$ |
| $n-C_5H_{11}$ |  | F | H | F | $CH_2CH_3$ |
| $n-C_5H_{11}$ |  | F | H | H | $CH_2CH_3$ |
| $n-C_5H_{11}$ | 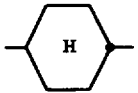 | H | H | F | $CH_2CH_3$ |
| $n-C_5H_{11}$ | 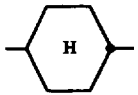 | H | H | H | $CH_2CH_3$ |
| $n-C_6H_{13}$ | 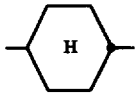 | F | F | F | $CH_2CH_3$ |

-continued

| R | $-(A^1-Z^1)_m-A^2-Z^2-$ | $L^1$ | $L^2$ | $L^3$ | Y |
|---|---|---|---|---|---|
| $n-C_6H_{13}$ | 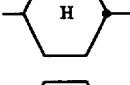 | F | F | H | $CH_2CH_3$ |
| $n-C_6H_{13}$ | 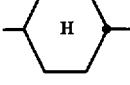 | F | H | F | $CH_2CH_3$ |
| $n-C_6H_{13}$ | 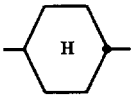 | F | H | H | $CH_2CH_3$ |
| $n-C_6H_{13}$ | 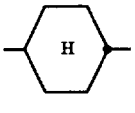 | H | H | F | $CH_2CH_3$ |
| $n-C_6H_{13}$ | 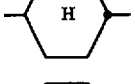 | H | H | H | $CH_2CH_3$ |
| $C_2H_5$ |  | F | F | F | $CH_3$ |
| $C_2H_5$ |  | F | F | H | $CH_3$ |
| $C_2H_5$ |  | F | H | F | $CH_3$ |
| $C_2H_5$ |  | F | H | H | $CH_3$ |
| $C_2H_5$ |  | H | H | F | $CH_3$ |
| $C_2H_5$ | 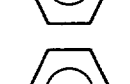 | H | H | H | $CH_3$ |
| $n-C_3H_7$ |  | F | F | F | $CH_3$ |
| $n-C_3H_7$ | 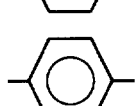 | F | F | H | $CH_3$ |
| $n-C_3H_7$ | 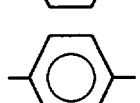 | F | H | F | $CH_3$ |
| $n-C_3H_7$ |  | H | H | F | $CH_3$ |

| R | $-(A^1-Z^1)_m-A^2-Z^2-$ | $L^1$ | $L^2$ | $L^3$ | Y |
|---|---|---|---|---|---|
| n-C$_3$H$_7$ |  | F | H | H | CH$_3$ |
| n-C$_3$H$_7$ |  | H | H | H | CH$_3$ |
| n-C$_5$H$_{11}$ |  | F | F | F | CH$_3$ |
| n-C$_5$H$_{11}$ |  | F | F | H | CH$_3$ |
| n-C$_5$H$_{11}$ |  | F | H | F | CH$_3$ |
| n-C$_5$H$_{11}$ |  | F | H | H | CH$_3$ |
| n-C$_5$H$_{11}$ | 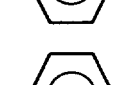 | H | H | F | CH$_3$ |
| n-C$_5$H$_{11}$ | 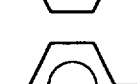 | H | H | H | CH$_3$ |
| n-C$_6$H$_{13}$ |  | F | F | F | CH$_3$ |
| n-C$_6$H$_{13}$ | 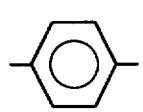 | F | F | H | CH$_3$ |
| n-C$_6$H$_{13}$ | 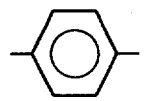 | F | H | F | CH$_3$ |
| n-C$_6$H$_{13}$ |  | F | H | H | CH$_3$ |
| n-C$_6$H$_{13}$ | 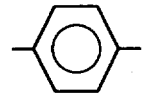 | H | H | F | CH$_3$ |
| n-C$_6$H$_{13}$ |  | H | H | H | CH$_3$ |
| C$_2$H$_5$ |  | F | F | F | CH$_2$CH$_3$ |
| C$_2$H$_5$ |  | F | F | H | CH$_2$CH$_3$ |
| C$_2$H$_5$ |  | F | H | F | CH$_2$CH$_3$ |
| C$_2$H$_5$ |  | F | H | H | CH$_2$CH$_3$ |
| C$_2$H$_5$ |  | H | H | F | CH$_2$CH$_3$ |
| C$_2$H$_5$ | 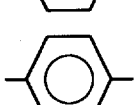 | H | H | H | CH$_2$CH$_3$ |
| n-C$_3$H$_7$ |  | F | F | H | CH$_2$CH$_3$ |
| n-C$_3$H$_7$ |  | F | H | F | CH$_2$CH$_3$ |
| n-C$_3$H$_7$ | 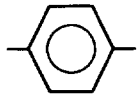 | H | H | F | CH$_2$CH$_3$ |
| n-C$_3$H$_7$ |  | F | H | H | CH$_2$CH$_3$ |
| n-C$_3$H$_7$ |  | H | H | H | CH$_2$CH$_3$ |
| n-C$_5$H$_{11}$ |  | F | F | F | CH$_2$CH$_3$ |
| n-C$_5$H$_{11}$ | 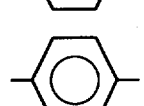 | F | F | H | CH$_2$CH$_3$ |
| n-C$_5$H$_{11}$ |  | F | H | F | CH$_2$CH$_3$ |
| n-C$_5$H$_{11}$ | | F | H | H | CH$_2$CH$_3$ |

| R | $-(A^1-Z^1)_m-A^2-Z^2-$ | $L^1$ | $L^2$ | $L^3$ | Y |
|---|---|---|---|---|---|
| n-C$_5$H$_{11}$ |  | H | H | F | CH$_2$CH$_3$ |
| n-C$_5$H$_{11}$ |  | H | H | H | CH$_2$CH$_3$ |
| n-C$_6$H$_{13}$ |  | F | F | F | CH$_2$CH$_3$ |
| n-C$_6$H$_{13}$ |  | F | F | H | CH$_2$CH$_3$ |
| n-C$_6$H$_{13}$ |  | F | H | F | CH$_2$CH$_3$ |
| n-C$_6$H$_{13}$ |  | F | H | H | CH$_2$CH$_3$ |
| n-C$_6$H$_{13}$ |  | H | H | F | CH$_2$CH$_3$ |
| n-C$_6$H$_{13}$ |  | H | H | H | CH$_2$CH$_3$ |
| C$_2$H$_5$ | 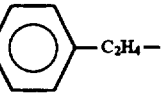 | F | F | F | CH$_3$ |
| C$_2$H$_5$ | 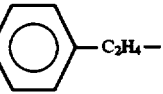 | F | F | H | CH$_3$ |
| C$_2$H$_5$ | 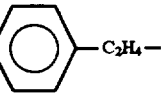 | F | H | F | CH$_3$ |
| C$_2$H$_5$ | 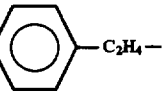 | F | H | H | CH$_3$ |
| C$_2$H$_5$ | 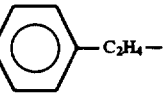 | H | H | F | CH$_3$ |
| C$_2$H$_5$ | 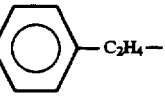 | H | H | H | CH$_3$ |
| n-C$_3$H$_7$ |  | F | F | F | CH$_3$ |
| n-C$_3$H$_7$ |  | F | F | H | CH$_3$ |
| n-C$_3$H$_7$ |  | F | H | F | CH$_3$ |
| n-C$_3$H$_7$ |  | H | H | F | CH$_3$ |
| n-C$_3$H$_7$ | 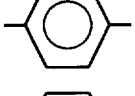 | F | H | H | CH$_3$ |
| n-C$_3$H$_7$ |  | H | H | H | CH$_3$ |
| n-C$_5$H$_{11}$ |  | F | F | F | CH$_3$ |
| n-C$_5$H$_{11}$ |  | F | F | H | CH$_3$ |
| n-C$_5$H$_{11}$ |  | F | H | F | CH$_3$ |
| n-C$_5$H$_{11}$ |  | F | H | H | CH$_3$ |
| n-C$_5$H$_{11}$ | 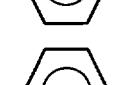 | H | H | F | CH$_3$ |
| n-C$_5$H$_{11}$ | 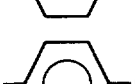 | H | H | H | CH$_3$ |
| n-C$_6$H$_{13}$ | 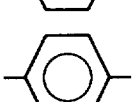 | F | F | F | CH$_3$ |
| n-C$_6$H$_{13}$ | 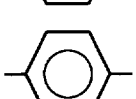 | F | F | H | CH$_3$ |
| n-C$_6$H$_{13}$ |  | F | H | F | CH$_3$ |

-continued

| R | $-(A^1-Z^1)_m-A^2-Z^2-$ | $L^1$ | $L^2$ | $L^3$ | Y |
|---|---|---|---|---|---|
| n-C$_6$H$_{13}$ | 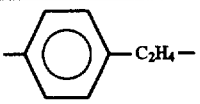 | F | H | H | CH$_3$ |
| n-C$_6$H$_{13}$ | 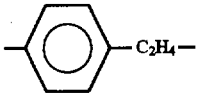 | H | H | F | CH$_3$ |
| n-C$_6$H$_{13}$ | 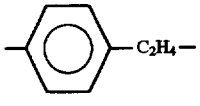 | H | H | H | CH$_3$ |
| C$_2$H$_5$ | 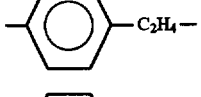 | F | F | F | CH$_2$CH$_3$ |
| C$_2$H$_5$ |  | F | F | H | CH$_2$CH$_3$ |
| C$_2$H$_5$ | 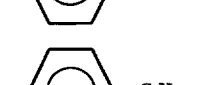 | F | H | F | CH$_2$CH$_3$ |
| C$_2$H$_5$ | 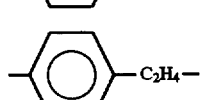 | F | H | H | CH$_2$CH$_3$ |
| C$_2$H$_5$ | 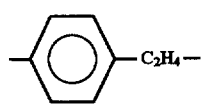 | H | H | F | CH$_2$CH$_3$ |
| C$_2$H$_5$ | 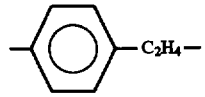 | H | H | H | CH$_2$CH$_3$ |
| n-C$_3$H$_7$ | 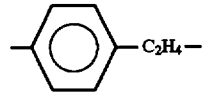 | F | F | F | CH$_2$CH$_3$ |
| n-C$_3$H$_7$ |  | F | F | H | CH$_2$CH$_3$ |
| n-C$_3$H$_7$ |  | F | H | F | CH$_2$CH$_3$ |
| n-C$_3$H$_7$ | 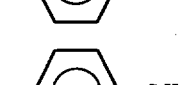 | H | H | F | CH$_2$CH$_3$ |
| n-C$_3$H$_7$ | 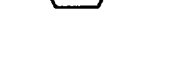 | F | H | H | CH$_2$CH$_3$ |
| n-C$_3$H$_7$ |  | H | H | H | CH$_2$CH$_3$ |

-continued

| R | $-(A^1-Z^1)_m-A^2-Z^2-$ | $L^1$ | $L^2$ | $L^3$ | Y |
|---|---|---|---|---|---|
| n-C$_5$H$_{11}$ | 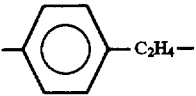 | F | F | F | CH$_2$CH$_3$ |
| n-C$_5$H$_{11}$ | 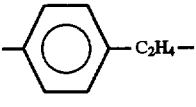 | F | F | H | CH$_2$CH$_3$ |
| n-C$_5$H$_{11}$ | 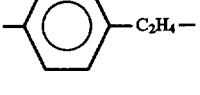 | F | H | F | CH$_2$CH$_3$ |
| n-C$_5$H$_{11}$ | 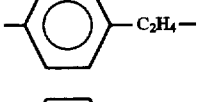 | F | H | H | CH$_2$CH$_3$ |
| n-C$_5$H$_{11}$ |  | H | H | F | CH$_2$CH$_3$ |
| n-C$_5$H$_{11}$ |  | H | H | H | CH$_2$CH$_3$ |
| n-C$_6$H$_{13}$ |  | F | F | F | CH$_2$CH$_3$ |
| n-C$_6$H$_{13}$ | 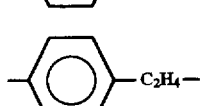 | F | F | H | CH$_2$CH$_3$ |
| n-C$_6$H$_{13}$ | 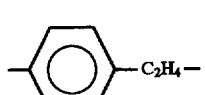 | F | H | F | CH$_2$CH$_3$ |
| n-C$_6$H$_{13}$ | 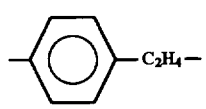 | F | H | H | CH$_2$CH$_3$ |
| n-C$_6$H$_{13}$ | 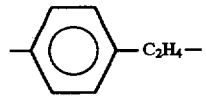 | H | H | F | CH$_2$CH$_3$ |
| n-C$_6$H$_{13}$ | 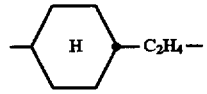 | H | H | H | CH$_2$CH$_3$ |
| C$_2$H$_5$ | 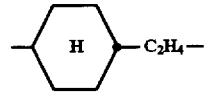 | F | F | F | CH$_3$ |
| C$_2$H$_5$ |  | F | F | H | CH$_3$ |

| R | —(A¹–Z¹)ₘ-A²–Z²— | L¹ | L² | L³ | Y |
|---|---|---|---|---|---|
| C₂H₅ | —⟨H⟩—C₂H₄— | F | H | F | CH₃ |
| C₂H₅ | —⟨H⟩—C₂H₄— | F | H | H | CH₃ |
| C₂H₅ | —⟨H⟩—C₂H₄— | H | H | F | CH₃ |
| C₂H₅ | —⟨H⟩—C₂H₄— | H | H | H | CH₃ |
| n-C₃H₇ | —⟨H⟩—C₂H₄— | F | F | F | CH₃ |
| n-C₃H₇ | —⟨H⟩—C₂H₄— | F | F | H | CH₃ |
| n-C₃H₇ | —⟨H⟩—C₂H₄— | F | H | F | CH₃ |
| n-C₃H₇ | —⟨H⟩—C₂H₄— | H | H | F | CH₃ |
| n-C₃H₇ | —⟨H⟩—C₂H₄— | F | H | H | CH₃ |
| n-C₃H₇ | —⟨H⟩—C₂H₄— | H | H | H | CH₃ |
| n-C₄H₉ | —⟨H⟩—C₂H₄— | F | F | F | CH₃ |
| n-C₄H₉ | —⟨H⟩—C₂H₄— | F | F | H | CH₃ |
| n-C₄H₉ | —⟨H⟩—C₂H₄— | F | H | F | CH₃ |
| n-C₄H₉ | —⟨H⟩—C₂H₄— | F | H | H | CH₃ |
| n-C₄H₉ | —⟨H⟩—C₂H₄— | H | H | F | CH₃ |
| n-C₄H₉ | —⟨H⟩—C₂H₄— | H | H | H | CH₃ |
| n-C₅H₁₁ | —⟨H⟩—C₂H₄— | F | F | F | CH₃ |
| n-C₅H₁₁ | —⟨H⟩—C₂H₄— | F | F | H | CH₃ |
| n-C₅H₁₁ | —⟨H⟩—C₂H₄— | F | H | F | CH₃ |
| n-C₅H₁₁ | —⟨H⟩—C₂H₄— | F | H | H | CH₃ |
| n-C₅H₁₁ | —⟨H⟩—C₂H₄— | H | H | F | CH₃ |
| n-C₅H₁₁ | —⟨H⟩—C₂H₄— | H | H | H | CH₃ |
| C₂H₅ | —⟨H⟩—C₂H₄— | F | F | F | CH₂CH₃ |
| C₂H₅ | —⟨H⟩—C₂H₄— | F | F | H | CH₂CH₃ |
| C₂H₅ | —⟨H⟩—C₂H₄— | F | H | F | CH₂CH₃ |
| C₂H₅ | —⟨H⟩—C₂H₄— | F | H | H | CH₂CH₃ |
| C₂H₅ | —⟨H⟩—C₂H₄— | H | H | F | CH₂CH₃ |
| C₂H₅ | —⟨H⟩—C₂H₄— | H | H | H | CH₂CH₃ |
| n-C₃H₇ | —⟨H⟩—C₂H₄— | F | F | F | CH₂CH₃ |

-continued

| R | $-(A^1-Z^1)_m-A^2-Z^2-$ | $L^1$ | $L^2$ | $L^3$ | Y |
|---|---|---|---|---|---|
| n-$C_3H_7$ | cyclohexyl-$C_2H_4-$ | F | F | H | $CH_2CH_3$ |
| n-$C_3H_7$ | cyclohexyl-$C_2H_4-$ | F | H | F | $CH_2CH_3$ |
| n-$C_3H_7$ | cyclohexyl-$C_2H_4-$ | H | H | F | $CH_2CH_3$ |
| n-$C_3H_7$ | cyclohexyl-$C_2H_4-$ | F | H | H | $CH_2CH_3$ |
| n-$C_3H_7$ | cyclohexyl-$C_2H_4-$ | H | H | H | $CH_2CH_3$ |
| n-$C_4H_9$ | cyclohexyl-$C_2H_4-$ | F | F | F | $CH_2CH_3$ |
| n-$C_4H_9$ | cyclohexyl-$C_2H_4-$ | F | F | H | $CH_2CH_3$ |
| n-$C_4H_9$ | cyclohexyl-$C_2H_4-$ | F | H | F | $CH_2CH_3$ |
| n-$C_4H_9$ | cyclohexyl-$C_2H_4-$ | F | H | H | $CH_2CH_3$ |
| n-$C_4H_9$ | cyclohexyl-$C_2H_4-$ | H | H | F | $CH_2CH_3$ |
| n-$C_4H_9$ | cyclohexyl-$C_2H_4-$ | H | H | H | $CH_2CH_3$ |
| n-$C_5H_{11}$ | cyclohexyl-$C_2H_4-$ | F | F | F | $CH_2CH_3$ |
| n-$C_5H_{11}$ | cyclohexyl-$C_2H_4-$ | F | F | H | $CH_2CH_3$ |
| n-$C_5H_{11}$ | cyclohexyl-$C_2H_4-$ | F | H | F | $CH_2CH_3$ |
| n-$C_5H_{11}$ | cyclohexyl-$C_2H_4-$ | F | H | H | $CH_2CH_3$ |
| n-$C_5H_{11}$ | cyclohexyl-$C_2H_4-$ | H | H | F | $CH_2CH_3$ |
| n-$C_5H_{11}$ | cyclohexyl-$C_2H_4-$ | H | H | H | $CH_2CH_3$ |

EXAMPLE 2

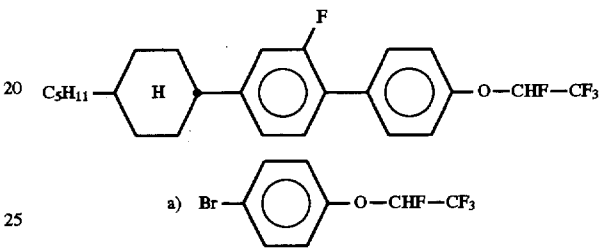

0.04 mol of 20% solution of diisobutylaluminum hydride in n-hexane is added dropwise at -70° C. under $N_2$ with stirring to a solution of 0.04 mol of 4-bromophenyl trifluoroacetate in 100 ml of hexane. The mixture is slowly warmed to room temperature, stirred overnight and carefully hydrolyzed with ice cooling. The organic phase is separated off, and the aqueous phase is extracted with methyl tert-butyl ether. The combined organic extracts are washed with water, dried over sodium sulfate, filtered and evaporated in a rotary evaporator. The residue is dissolved in 20 ml of dichloromethane, and 0.0375 mol of DAST are added dropwise with ice cooling. The mixture is stirred at room temperature for 6 hours and then refluxed for 15 hours. The mixture is subsequently introduced dropwise into approx. 50 ml of ice water. The organic phase is separated off, and the aqueous phase is extracted a number of times with dichloromethane. The product is finally subjected to conventional work-up.

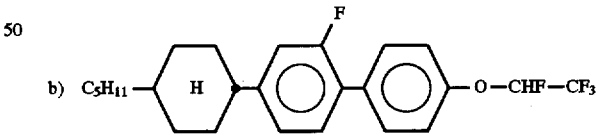

0.06 mol of p-trans-[4-pentylcyclohexyl]-2-fluorophenylboronic acid in 60 ml of toluene are added to 4.8 g of NaOH in 30 ml of water, and the mixture is stirred at 45° C. for 0.5 hour. 0.03 mol of 1-(1,2,2,2-tetrafluoroethoxy)-4-bromobenzene and 0.7 g of tetrakis(triphenylphosphine)palladium(0) are added to the solution, and the mixture is stirred at 100° C. overnight. The mixture is cooled to room temperature, and the organic phase is separated off. The solvent is removed in a rotary evaporator, and the residue is recrystallized from n-hexane using petroleum ether.

The following compounds of the formula

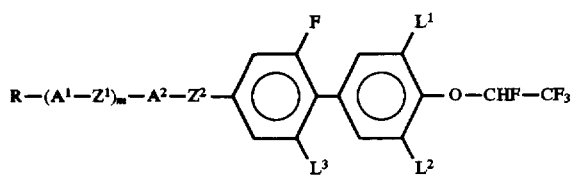

are prepared analogously:

| R | $-(A^1-Z^1)_m-A^2-Z^2$ | $L^1$ | $L^2$ | $L^3$ |
|---|---|---|---|---|
| n-$C_6H_{13}$ | [Cy]-[Ph] | H | H | H |
| n-$C_6H_{13}$ | [Cy]-[Ph] | H | H | F |
| n-$C_6H_{13}$ | [Cy]-[Ph] | F | H | H |
| n-$C_6H_{13}$ | [Cy]-[Ph] | F | F | H |
| n-$C_6H_{13}$ | [Cy]-[Ph] | F | H | F |
| n-$C_6H_{13}$ | [Cy]-[Ph] | F | F | F |
| $CH_3-CH=CH-$ | [Cy]-[Ph] | F | F | F |
| $CH_2=CH-$ | [Cy]-[Ph] | F | F | F |
| $C_2H_5$ | [Cy]-[Ph] | H | H | H |
| $C_2H_5$ | [Cy]-[Ph] | H | H | F |
| $C_2H_5$ | [Cy]-[Ph] | F | H | H |
| $C_2H_5$ | [Cy]-[Ph] | F | F | H |
| $C_2H_5$ | [Cy]-[Ph] | F | H | F |
| $C_2H_5$ | [Cy]-[Ph] | F | F | F |
| n-$C_3H_7$ | [Cy]-[Ph] | H | H | H |

-continued

| R | $-(A^1-Z^1)_m-A^2-Z^2$ | $L^1$ | $L^2$ | $L^3$ | |
|---|---|---|---|---|---|
| n-$C_3H_7$ | [Cy]-[Ph] | H | H | F | |
| n-$C_3H_7$ | [Cy]-[Ph] | F | H | H | |
| n-$C_3H_7$ | [Cy]-[Ph] | F | F | H | |
| n-$C_3H_7$ | [Cy]-[Ph] | F | H | F | |
| n-$C_3H_7$ | [Cy]-[Ph] | F | F | F | C 104 l; $\Delta n = +0.102$; $\Delta\epsilon = 20.92$ |
| n-$C_5H_{11}$ | [Cy]-[Ph] | H | H | F | |
| n-$C_5H_{11}$ | [Cy]-[Ph] | F | H | H | |
| n-$C_5H_{11}$ | [Cy]-[Ph] | F | F | H | |
| n-$C_5H_{11}$ | [Cy]-[Ph] | F | H | F | |
| n-$C_5H_{11}$ | [Cy]-[Ph] | F | F | F | C 98 l; $\Delta n = +0.116$; $\Delta\epsilon = 22.22$ |

EXAMPLE 3

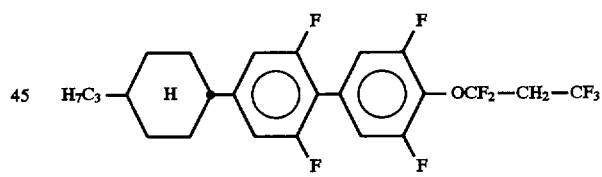

Step 3.1

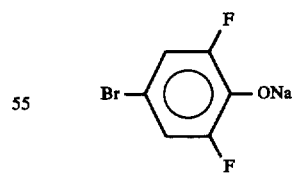

1.0 mol of sodium hydride are suspended in 200 ml of THF at 0° C. in a nitrogen atmosphere. 1.0 ml of 4-bromo-2,6-difluorophenol, dissolved in 400 ml of THF, is added dropwise to the suspension. The mixture is allowed to warm to room temperature, is stirred for a further 0.5 hour, is filtered and is evaporated in a rotary evaporator. The residue is dissolved in 150 ml of toluene and re-evaporated until crystals form. The product recrystallized from petroleum ether.

Step 3.2

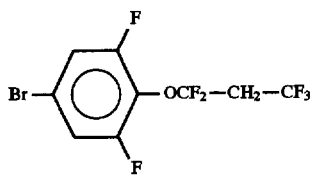

0.2 mol of 4-bromo-2,6-difluorophenol and 0.02 mol of sodium 4-bromo-2,6-difluorophenoxide are dissolved in 400 ml of DMEU. 0.66 mol of pentafluoropropene are introduced into the solution at 5° C. The solution is subsequently heated at 120° C. for 16 hours in an autoclave, allowed to cool to room temperature and poured into water. The organic phase is separated off and subjected to conventional work-up.

Step 3.3

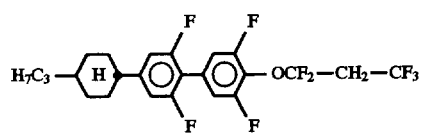

A solution comprising 0.02 mol of 4-bromo-2,6-difluoro-1,1,3,3,3-pentafluoropropyl ether in 85 ml of THF is heated to 60° C., and 0.02 mol of p-trans-[4-propyleyclohexyl]-2,6-difluorophenylboronic acid and a solution comprising 0.02 mol of potassium dihydrogenphosphate and 0.04 mol of sodium hydrogenphosphate and 40 ml of water are added. After 0.33 g of tetrakis(triphenylphosphine)palladium (0) has been added, the mixture is stirred at 70° C. overnight. The reaction mixture is subsequently allowed to cool to room temperature. The organic phase is separated off and subjected to conventional work-up.

The following compounds of the formula

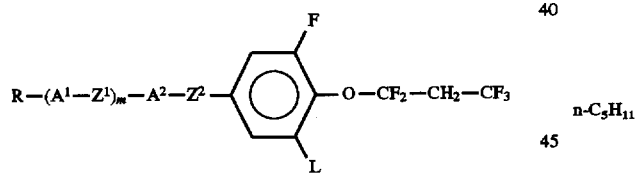

are prepared analogously:

| R | $-(A^1-Z^1)_m-A^2-Z^2-$ | L |
|---|---|---|
| CH$_3$ | [Cy-Phenyl(3,5-F)] | H |
| CH$_3$ | [Cy-Phenyl(3,4,5-F)] | F |
| C$_2$H$_5$ | [Cy-Phenyl(3,5-F)] | H |
| C$_2$H$_5$ | [Cy-Phenyl(3,4,5-F)] | F |
| n-C$_3$H$_7$ | [Cy-Phenyl(3,5-F)] | H |
| n-C$_4$H$_9$ | [Cy-Phenyl(3,5-F)] | H |
| n-C$_4$H$_9$ | [Cy-Phenyl(3,4,5-F)] | F |
| n-C$_5$H$_{11}$ | [Cy-Phenyl(3,5-F)] | H |
| n-C$_5$H$_{11}$ | [Cy-Phenyl(3,4,5-F)] | F |
| n-C$_6$H$_{13}$ | [Cy-Phenyl(3,5-F)] | H |

-continued

| R | $-(A^1-Z^1)_m-A^2-Z^2-$ | L |
|---|---|---|
| n-C$_6$H$_{13}$ | 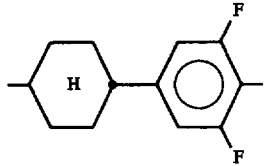 | F |
| H$_2$C=CH— | 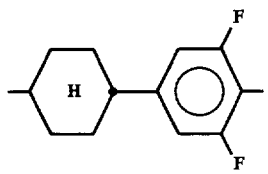 | H |
| H$_2$C=CH— | 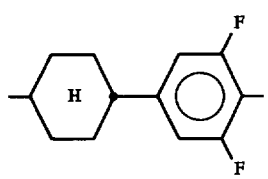 | F |
| H$_3$C—CH=CH— | 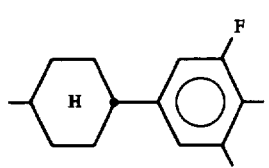 | H |
| H$_3$C—CH=CH— | 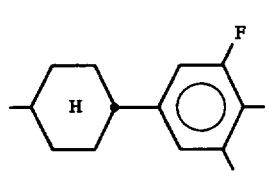 | F |
| C$_2$H$_5$ | 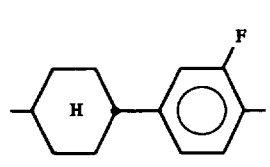 | H |
| C$_2$H$_5$ | 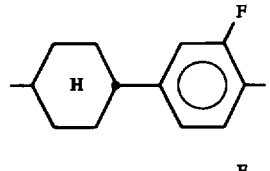 | F |
| n-C$_3$H$_7$ | 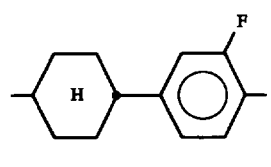 | H |
| n-C$_3$H$_7$ | 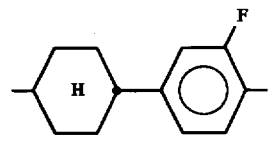 | F |

-continued

| R | $-(A^1-Z^1)_m-A^2-Z^2-$ | L |
|---|---|---|
| n-C$_5$H$_{11}$ | 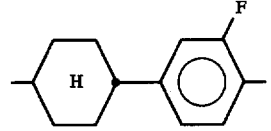 | H |
| n-C$_5$H$_{11}$ | 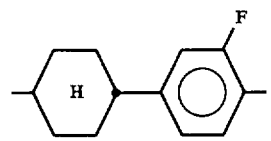 | F |
| H$_2$C=CH— | 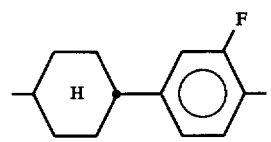 | H |
| H$_2$C=CH— | 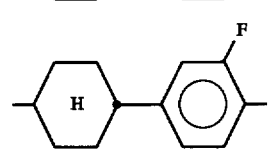 | F |

EXAMPLE 4

0.2 mol of I are stirred at 120° C. for 24 hours in 350 ml of anhydrous hydrogen fluoride in a Hostalloy autoclave. After the mixture has been cooled to 0° C., ice-water and dichloromethane are added. The organic phase is separated off, washed with water, 10% sodium hydroxide solution and again with water and evaporated in vacuo. The residue is chromatographed on a silica-gel column using hexane. Clp.$_{extr.}$=40; Δε=16.5; Δn=+0.125.

The following compounds of the formula

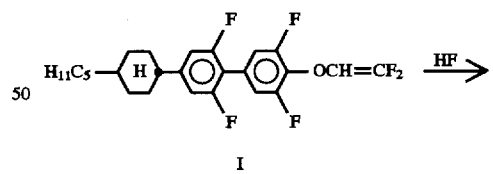

I

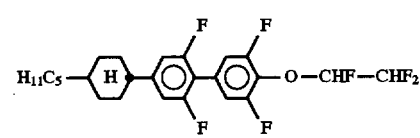

II

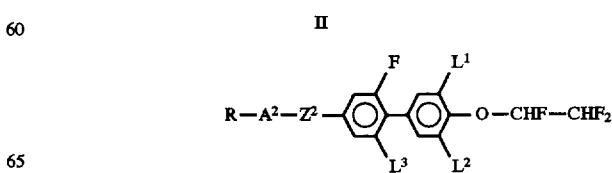

are prepared analogously:

| R | -A²-Z²- | L¹ | L² | L³ | |
|---|---|---|---|---|---|
| C₂H₅ | cyclohexyl(H) | H | H | H | |
| C₂H₅ | cyclohexyl(H) | H | H | F | |
| C₂H₅ | cyclohexyl(H) | F | H | H | |
| C₂H₅ | cyclohexyl(H) | F | F | H | |
| C₂H₅ | cyclohexyl(H) | F | H | F | |
| C₂H₅ | cyclohexyl(H) | F | F | F | |
| n-C₃H₇ | cyclohexyl(H) | H | H | H | |
| n-C₃H₇ | cyclohexyl(H) | H | H | F | |
| n-C₃H₇ | cyclohexyl(H) | F | H | H | |
| n-C₃H₇ | cyclohexyl(H) | F | F | H | Clp. = 92° C.; Δn = +0.136; Δε = 15 |
| n-C₃H₇ | cyclohexyl(H) | F | H | F | |
| n-C₃H₇ | cyclohexyl(H) | F | F | F | Clp.ext = 35° C.; Δn = +0.127; Δε = 17 |
| n-C₅H₁₁ | cyclohexyl(H) | H | H | F | |
| n-C₅H₁₁ | cyclohexyl(H) | F | H | H | |
| n-C₅H₁₁ | cyclohexyl(H) | F | F | H | |
| n-C₅H₁₁ | cyclohexyl(H) | F | H | F | |
| n-C₅H₁₁ | cyclohexyl(H) | H | H | H | |
| n-C₆H₁₃ | cyclohexyl(H) | H | H | H | |
| n-C₆H₁₃ | cyclohexyl(H) | H | H | F | |
| n-C₆H₁₃ | cyclohexyl(H) | F | H | H | |
| n-C₆H₁₃ | cyclohexyl(H) | F | F | H | |
| n-C₆H₁₃ | cyclohexyl(H) | F | H | F | |
| n-C₆H₁₃ | cyclohexyl(H) | F | F | F | |
| C₂H₅ | cyclohexyl(H)-C₂H₄- | H | H | H | |
| C₂H₅ | cyclohexyl(H)-C₂H₄- | H | H | F | |
| C₂H₅ | cyclohexyl(H)-C₂H₄- | F | H | H | |
| C₂H₅ | cyclohexyl(H)-C₂H₄- | F | F | H | |
| C₂H₅ | cyclohexyl(H)-C₂H₄- | F | H | F | |
| C₂H₅ | cyclohexyl(H)-C₂H₄- | F | F | F | |

-continued

| R | -A²-Z²- | L¹ | L² | L³ |
|---|---|---|---|---|
| n-C₃H₇ | [cyclohexyl(H)]-C₂H₄- | H | H | H |
| n-C₃H₇ | [cyclohexyl(H)]-C₂H₄- | H | H | F |
| n-C₃H₇ | [cyclohexyl(H)]-C₂H₄- | F | H | H |
| n-C₃H₇ | [cyclohexyl(H)]-C₂H₄- | F | F | H |
| n-C₃H₇ | [cyclohexyl(H)]-C₂H₄- | F | H | F |
| n-C₃H₇ | [cyclohexyl(H)]-C₂H₄- | F | F | F |
| n-C₅H₁₁ | [cyclohexyl(H)]-C₂H₄- | H | H | F |
| n-C₅H₁₁ | [cyclohexyl(H)]-C₂H₄- | F | H | H |
| n-C₅H₁₁ | [cyclohexyl(H)]-C₂H₄- | F | F | H |
| n-C₅H₁₁ | [cyclohexyl(H)]-C₂H₄- | F | H | F |
| n-C₅H₁₁ | [cyclohexyl(H)]-C₂H₄- | F | F | F |
| n-C₆H₁₃ | [cyclohexyl(H)]-C₂H₄- | H | H | H |
| n-C₆H₁₃ | [cyclohexyl(H)]-C₂H₄- | H | H | F |
| n-C₆H₁₃ | [cyclohexyl(H)]-C₂H₄- | F | H | H |

-continued

| R | -A²-Z²- | L¹ | L² | L³ |
|---|---|---|---|---|
| n-C₆H₁₃ | [cyclohexyl(H)]-C₂H₄- | F | F | H |
| n-C₆H₁₃ | [cyclohexyl(H)]-C₂H₄- | F | H | F |
| n-C₆H₁₃ | [cyclohexyl(H)]-C₂H₄- | F | F | F |
| C₂H₅ | [phenyl]- | H | H | H |
| C₂H₅ | [phenyl]- | H | H | F |
| C₂H₅ | [phenyl]- | F | H | H |
| C₂H₅ | [phenyl]- | F | F | H |
| C₂H₅ | [phenyl]- | F | H | F |
| C₂H₅ | [phenyl]- | F | F | F |
| n-C₃H₇ | [phenyl]- | H | H | H |
| n-C₃H₇ | [phenyl]- | H | H | F |
| n-C₃H₇ | [phenyl]- | F | H | H |
| n-C₃H₇ | [phenyl]- | F | F | H |
| n-C₃H₇ | [phenyl]- | F | H | F |
| n-C₃H₇ | [phenyl]- | F | F | F |

-continued
| R | -A²-Z²- | L¹ | L² | L³ |
|---|---|---|---|---|
| n-C₅H₁₁ |  | H | H | F |
| n-C₅H₁₁ |  | F | H | H |
| n-C₅H₁₁ |  | F | F | H |
| n-C₅H₁₁ | 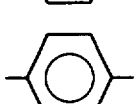 | F | H | F |
| n-C₅H₁₁ | 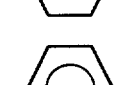 | F | F | F |
| n-C₆H₁₃ |  | H | H | H |
| n-C₆H₁₃ |  | H | H | F |
| n-C₆H₁₃ |  | F | H | H |
| n-C₆H₁₃ |  | F | F | H |
| n-C₆H₁₃ |  | F | H | F |
| n-C₆H₁₃ | 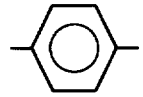 | F | F | F |
| C₂H₅ | 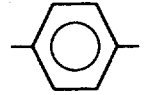 | H | H | H |
| C₂H₅ | 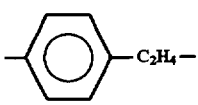 | H | H | F |
| C₂H₅ | 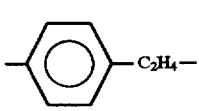 | F | H | H |
-continued
| R | -A²-Z²- | L¹ | L² | L³ |
|---|---|---|---|---|
| C₂H₅ | 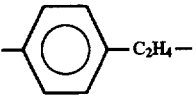 | F | F | H |
| C₂H₅ | 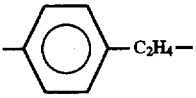 | F | H | F |
| C₂H₅ | 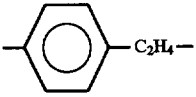 | F | F | F |
| n-C₃H₇ | 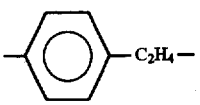 | H | H | H |
| n-C₃H₇ | 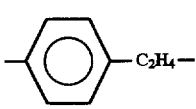 | H | H | F |
| n-C₃H₇ | 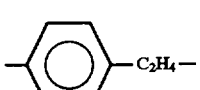 | F | H | H |
| n-C₃H₇ | 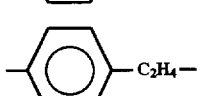 | F | F | H |
| n-C₃H₇ | 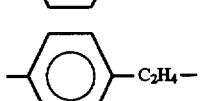 | F | H | F |
| n-C₃H₇ | 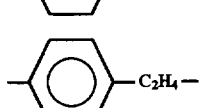 | F | F | F |
| n-C₅H₁₁ |  | H | H | F |
| n-C₅H₁₁ |  | F | H | H |
| n-C₅H₁₁ |  | F | H | F |
| n-C₅H₁₁ |  | F | F | H |
| n-C₅H₁₁ |  | F | F | F |
| n-C₆H₁₃ |  | H | H | H |

-continued

| R | -A²-Z²- | L¹ | L² | L³ |
|---|---|---|---|---|
| n-C₆H₁₃ | 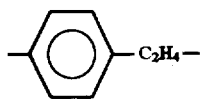—C₂H₄— | H | H | F |
| n-C₆H₁₃ | 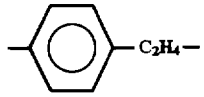—C₂H₄— | F | H | H |
| n-C₆H₁₃ | 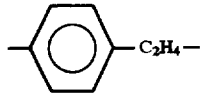—C₂H₄— | F | F | H |
| n-C₆H₁₃ | —C₂H₄— | F | H | F |
| n-C₆H₁₃ | —C₂H₄— | F | F | F |

Mixture examples

Example A

| | | | |
|---|---|---|---|
| PCH-5F | 9.0% | Clearing point [°C.] | 88 |
| PCH-6F | 7.2% | Δn [589 nm, 20° C.] | 0.1001 |
| PCH-7F | 5.4% | Δε [1 kHz, 20° C.] | 6.4 |
| CCP-20CF₃ | 7.2% | V₍₁₀,₀,₂₀₎ [V] | 1.85 |
| CCP-30CF₃ | 10.8% | | |
| CCP-40CF₃ | 8.1% | | |
| CCP-50CF₃ | 8.1% | | |
| BCH-3F.F | 10.8% | | |
| BCH-5F.F | 9.0% | | |
| ECCP-30CF₃ | 4.5% | | |
| ECCP-50CF₃ | 4.5% | | |
| CBC-33F | 1.8% | | |
| CBC-53F | 1.8% | | |
| CUU-3-OMD | 10.0% | | |

Example B

| | | | |
|---|---|---|---|
| PCH-5F | 9.0% | Clearing point [°C.] | 88 |
| PCH-6F | 7.2% | Δn [589 nm, 20° C.] | 0.0998 |
| PCH-7F | 5.4% | Δε [1 kHz, 20° C.] | 6.4 |
| CCP-20CF₃ | 7.2% | V₍₁₀,₀,₂₀₎ [V] | 1.89 |
| CCP-30CF₃ | 10.8% | | |
| CCP-40CF₃ | 8.1% | | |
| CCP-50CF₃ | 8.1% | | |
| BCH-3F.F | 10.8% | | |
| BCH-5F.F | 9.0% | | |
| ECCP-30CF₃ | 4.5% | | |
| ECCP-50CF₃ | 4.5% | | |
| CBC-33F | 1.8% | | |
| CBC-53F | 1.8% | | |
| CUU-5-OMD | 10.0% | | |

Example C

| | | | |
|---|---|---|---|
| PCH-5F | 9.0% | Clearing point [°C.] | 90.5 |
| PCH-6F | 7.2% | Δn [589 nm, 20° C.] | 0.1009 |
| PCH-7F | 5.4% | Δε [1 kHz, 20° C.] | 6.2 |
| CCP-20CF₃ | 7.2% | V₍₁₀,₀,₂₀₎ [V] | 1.94 |
| CCP-30CF₃ | 10.8% | | |
| CCP-40CF₃ | 8.1% | | |
| CCP-50CF₃ | 8.1% | | |
| BCH-3F.F | 10.8% | | |
| BCH-5F.F | 9.0% | | |
| ECCP-30CF₃ | 4.5% | | |
| ECCP-50CF₃ | 4.5% | | |

-continued

| | |
|---|---|
| CBC-33F | 1.8% |
| CBC-53F | 1.8% |
| CGU-3-OMD | 10.0% |

We claim:

1. A compound of the formula I

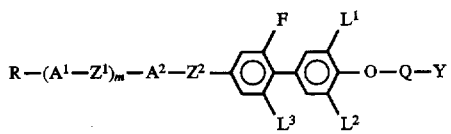

in which

R is H, an alkyl or alkenyl radical having 1 to 15 carbon atoms which is unsubstituted or monosubstituted by CN or CF₃ or at least monosubstituted by halogen, one or more CH₂ groups in these radicals optionally being replaced, in each case independently of one another, by —O—, —S—,

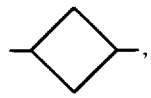

—CO—, —CO—O—, —O—CO— or —O—CO—O— in such a manner that O atoms are not linked directly to one another, A¹ and A² are each, independently of one another,
(a) a trans-1,4-cyclohexylene radical in which each of one or two nonadjacent CH₂ groups are optionally replaced by —O— or —S—,
(b) a 1,4-phenylene radical in which one or two CH groups are optionally replaced by N,
(c) a radical from the group consisting of 1,4-cyclohexylene, 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl, the radicals (a) and (b) optionally being substituted by one or two fluorine atoms, Z¹ and Z² are each, independently of one another, —CO—O—, —O—CO—, —CH₂O—, —OCH₂—, —CH₂CH₂—, —CH=CH—, —C≡C— or a single bond, and one of the radicals Z¹ and Z² is alternatively —(CH₂)₄— or —CH=CH—CH₂CH₂—, and Q is —CHF— or —CF₂—, Y is a —CH₃, —CH₂CH₃, —CHF₂, —CH₂CF₃ or —CF₂—CHF₂ group or, when Q is —CHF— also a —CF₃ group,

L¹, L² and L³ are each, independently of one another, H or F, and m is 0, 1 or 2.

2. A compound of claim 1 of the formula I2

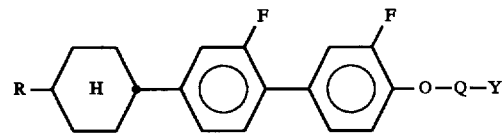

in which R, Q and Y are as defined in claim 1.

3. A compound of claim 1 of the formula

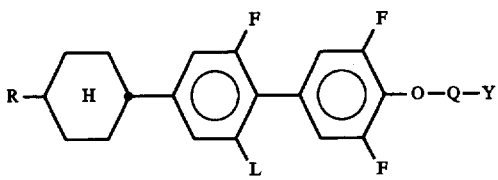

in which R, Q and Y are as defined in claim 1, and L is H or F.

4. A compound of claim 1 of the formula I5

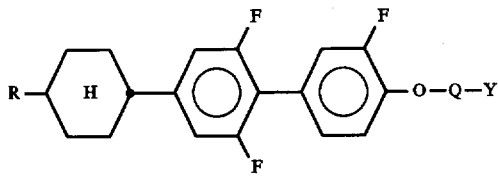

in which R, Q and Y are as defined in claim 1.

5. A compound according to one of claim 1, in which Q—Y is $CHF—CHF_2$, $CF_2—CH_2—CF_3$, $CF_2—CH_3$, $CF_2—CH_2—CHF_2$, $CHF—CF_2—CHF_2$ or $CF_2—CH_2—CHF_2$.

6. A liquid-crystalline medium comprising at least two liquid-crystalline components wherein at least one of the components is a compound of the formula I of claim 1.

7. A liquid-crystal display element comprising a liquid-crystalline medium according to claim 6.

8. An electro-optical display element comprising, as a dielectric, a liquid-crystalline medium according to claim 6.

9. A compound of claim 1, wherein m is 0.

10. A compound of claim 1, wherein $L^3$ is fluorine.

11. A compound of claim 1, wherein each of $L^1$, $L^2$ and $L^3$ are fluorine.

12. A compound of claim 1, wherein R is alkyl or alkoxy.

13. A compound of claim 1, wherein $A^1$ and $A^2$ are independently 1,4-phenylene optionally monosubstituted or disubstituted by F or mono-substituted by CN.

14. A compound of claim 1 which exhibits a dielectric anisotropy, Δε, of from 15–20.

15. The compound of claim 1, wherein $L^1$ and $L^2$ are each F.

16. A compound of the formula

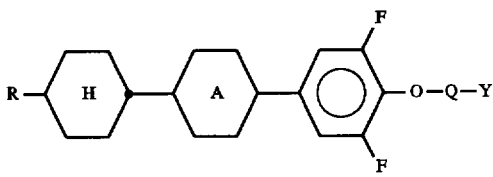

in which

R is H, an alkyl or alkenyl radical having 1 to 15 carbon atoms which is unsubstituted or monosubstituted by CN or $CF_3$ or at least monosubstituted by halogen, one or more $CH_2$ groups in these radicals optionally being replaced, in each case independently of one another, by —O—, —S—,

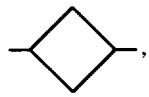

—CO—, —CO—O—, —O—CO— or —O—CO—O— in such a manner that O atoms are not linked directly to one another,

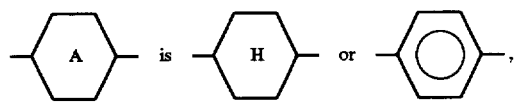

and Q—Y is $CHF—CHF_2$ or $CF_2—CH_2—CF_3$.

* * * * *